US008689677B2

(12) United States Patent
Minard et al.

(10) Patent No.: US 8,689,677 B2
(45) Date of Patent: Apr. 8, 2014

(54) DATA INPUT SYSTEM IN POSTMIX DISPENSER

(75) Inventors: James J. Minard, Rockton, IL (US); Mark E. Bush, Rockton, IL (US)

(73) Assignee: Carrier Corporation, Farmington, CT (US)

( * ) Notice: Subject to any disclaimer, the term of this patent is extended or adjusted under 35 U.S.C. 154(b) by 1581 days.

(21) Appl. No.: 12/094,344

(22) PCT Filed: Dec. 12, 2005

(86) PCT No.: PCT/US2005/045089

§ 371 (c)(1), (2), (4) Date: Oct. 7, 2008

(87) PCT Pub. No.: WO2007/070032

PCT Pub. Date: Jun. 21, 2007

(65) Prior Publication Data

US 2010/0036528 A1 Feb. 11, 2010

(51) Int. Cl.
*B67D 1/00* (2006.01)
*G05B 21/00* (2006.01)

(52) U.S. Cl.
USPC .......... 99/275

(58) Field of Classification Search
USPC ......... 99/275; 700/265, 275; 235/487, 375–6, 235/381; 222/52, 1, 23, 57, 63, 129.1, 222/129.3, 146.6, 129.4, 325, 146.2, 156, 222/159, 95
See application file for complete search history.

(56) References Cited

U.S. PATENT DOCUMENTS 5,845,603 A * 12/1998 Efaw .................... 119/605
7,614,524 B2 * 11/2009 Girard et al. .............. 222/129.4
2010/0280656 A1 * 11/2010 Chirnomas .............. 700/232

FOREIGN PATENT DOCUMENTS

EP 1489042 12/2004
WO WO-9323327 11/1993
WO WO-2006013362 2/2006

OTHER PUBLICATIONS

International Preliminary Report on Patentability mailed Nov. 29, 2010 (9 pgs.).

* cited by examiner

*Primary Examiner* — Shawntina Fuqua
(74) *Attorney, Agent, or Firm* — Cantor Colburn LLP

(57) ABSTRACT

A beverage dispenser comprises a diluent delivery system, concentrate delivery system, mixing and dispensing system, and control system. The concentrate delivery system employs a positive displacement pump. The control system receives package-specific information from a scanner and diluent flow rate information from the flowmeter, and then determines the pump speed in order to set a desired mix ratio.

18 Claims, 16 Drawing Sheets

DATA INPUT SYSTEM IN POSTMIX DISPENSER

TECHNICAL FIELD

The invention generally relates to liquid or semi-liquid dispensing systems in general, and more particularly, to beverage dispensers where one or more concentrates are mixed in a potable liquid according to a predetermined ratio.

BACKGROUND OF THE INVENTION

Liquid dispensers are widely used in various industries. Chemical solutions including fertilizers, pesticides, and detergents and so on are often mixed from various concentrates and solvents before dispensed for use or storage. Similar dispensers also find applications in the medical field. In the food and beverage industry, liquid dispensers are widely used in all kinds of venues such as quick service restaurants.

The liquid dispensers used in food and beverage industry reconstitute juice syrup concentrates with a potable diluent, e.g., potable water, and then dispense the reconstituted juice into a container at the point of consumption. This kind of dispensers are sometimes called "postmix" dispensers as they produce a final product in contrast to a "premix" beverage that is prepackaged with the final constituents (flavor, gas, etc.) and ready for consumption. For safety and taste reasons, a postmix beverage dispenser often requires refrigeration in the dispenser of various components that eventually go into the postmix product.

One particular concern for operators of postmix dispensers is quality control. The correct mix ratio among the constituents needs to be entered into the ratio-setting mechanism in the dispenser in between changes of constituent supplies. Ideally, the dispenser can monitor the amount of supplies remaining in order to avoid of either running out or running low. The expiration date of the supply is also important to guarantee quality and consumer safety. While various methods and systems have been devised to enter similar information into a dispenser, there remains a need for a user-friendly and efficient data input system.

SUMMARY OF THE INVENTION

The present invention relates to various features of an improved liquid dispenser. These features will be discussed, for purpose of illustration, in the context of food and beverage industry but should not be contemplated to be limited to such applications.

The present invention provides a unique identifier for each concentrate package that goes into the postmix dispenser. The identifier also allows the dispenser to track concentrate use throughout the package life. The identifier is generated based on a label associated with each package. The label includes package-specific information for the dispenser to function properly.

In one aspect, the invention provides a machine-readable label for a concentrate package to be used in a beverage dispenser. The label includes an indicium for a desired compositional ratio between the concentrate and a diluent in a postmix product; and a further indicium that includes unique information specific to the package. Examples of the further indicium include expiration date of the package, packaging time, the identity of the concentrate, and a desired concentrate volume for a given postmix product (e.g., whether ice should be added to the product). In one embodiment, the packaging time may indicate at which second the package is produced. The packaging time may be unique to each package and enables the generation of the unique identifier.

In one feature, the machine-readable label may be readable by an optical scanner, or through radio frequency. In one embodiment, the label is a barcode. The label may be fabricated in a waterproof form. It may be permanently associated with the package.

In another aspect, the invention provides a beverage dispenser that includes a control system configured to receive information from a machine-readable label for a concentrate package to be used in the dispenser. The label comprising an indicium for a desired compositional ratio between the concentrate and a diluent in a postmix product; and a further indicium comprising unique information specific to the package. The dispenser may include a positive displacement pump that pumps a desired amount of the concentrate according to the desired compositional ratio.

In one feature, the control system in the dispenser calculates the desire amount of the concentrate based on a flow rate of the diluent. In one embodiment, the control system generates a unique identifier for the package and tracks an amount of dispensed concentrate. In another feature, the dispenser includes a device, e.g., radio frequency sensor that reads the label.

In yet another aspect, the invention provides a method for mechanically mixing a beverage. The method includes the steps of providing a concentrate package bearing a machine-readable label of the invention, extracting information from the machine-readable label, providing a control system for receiving and processing information extracted from the machine-readable label; and mixing the concentrate and the diluent in a dispenser under control of the control system according to information from the machine-readable label.

In a further aspect, the invention provides a method for manufacturing a package of a concentrate by marking the package with a machine-readable label of the invention.

BRIEF DESCRIPTION OF THE DRAWINGS

The foregoing, and other features and advantages of the invention, as well as the invention itself, will be more fully understood from the description, drawings and claims that follow. The drawings are not necessarily to scale, emphasis instead generally being placed upon illustrating the principles of the invention. In the drawings, like numerals are used to indicate like parts throughout the various views and various embodiments.

DETAILED DESCRIPTION OF THE INVENTION

Features of the invention may work by itself or in combination as shall be apparent to by one skilled in the art. The lack of repetition is meant for brevity and not to limit the scope of the claim. Unless otherwise indicated, all terms used herein have the same meaning as they would to one skilled in the art of the present invention.

The term "beverage" as used herein refers to a liquid or a semi-liquid for consumption, and includes but are not limited to, juices, syrups, sodas (carbonated or still), water, milk, yogurt, slush, ice-cream, other dairy products, and any combination thereof.

The terms "control system," "control circuit" and "control" as a noun are used interchangeably herein.

The term "liquid" as used herein refers to pure liquid and a mixture where a significant portion is liquid such that the mixture may be liquid, semi-liquid or contains small amounts of solid substances.

The present invention provides a liquid or semi-liquid dispenser that refrigerates a liquid flow inside the dispenser on demand. By "on demand," it is meant to refer to the capability for chilling a target without significant delay. Typically for a beverage dispenser, e.g., those used in the quick service restaurants, fluid flows inside the dispenser are intermittent. The beverage flow may be almost continuous during meal hours, but may have extended idle time up to hours during slow time. Existing beverage dispensers that use a cold reserve such as an ice bank necessitate constant replenishing of the reserve as the reserve constantly dissipates heat, a wasteful system that often requires constant maintenance and service by human operators.

To be able to handle both the busy and slow hours in usage without constantly wasting energy, a desirable refrigeration system needs a high degree of efficiency in the heat-exchange section of the refrigeration system. The present invention provides such a refrigeration system designed to function in a liquid dispenser. Examples of such a liquid dispenser are now described.

Figure 1:
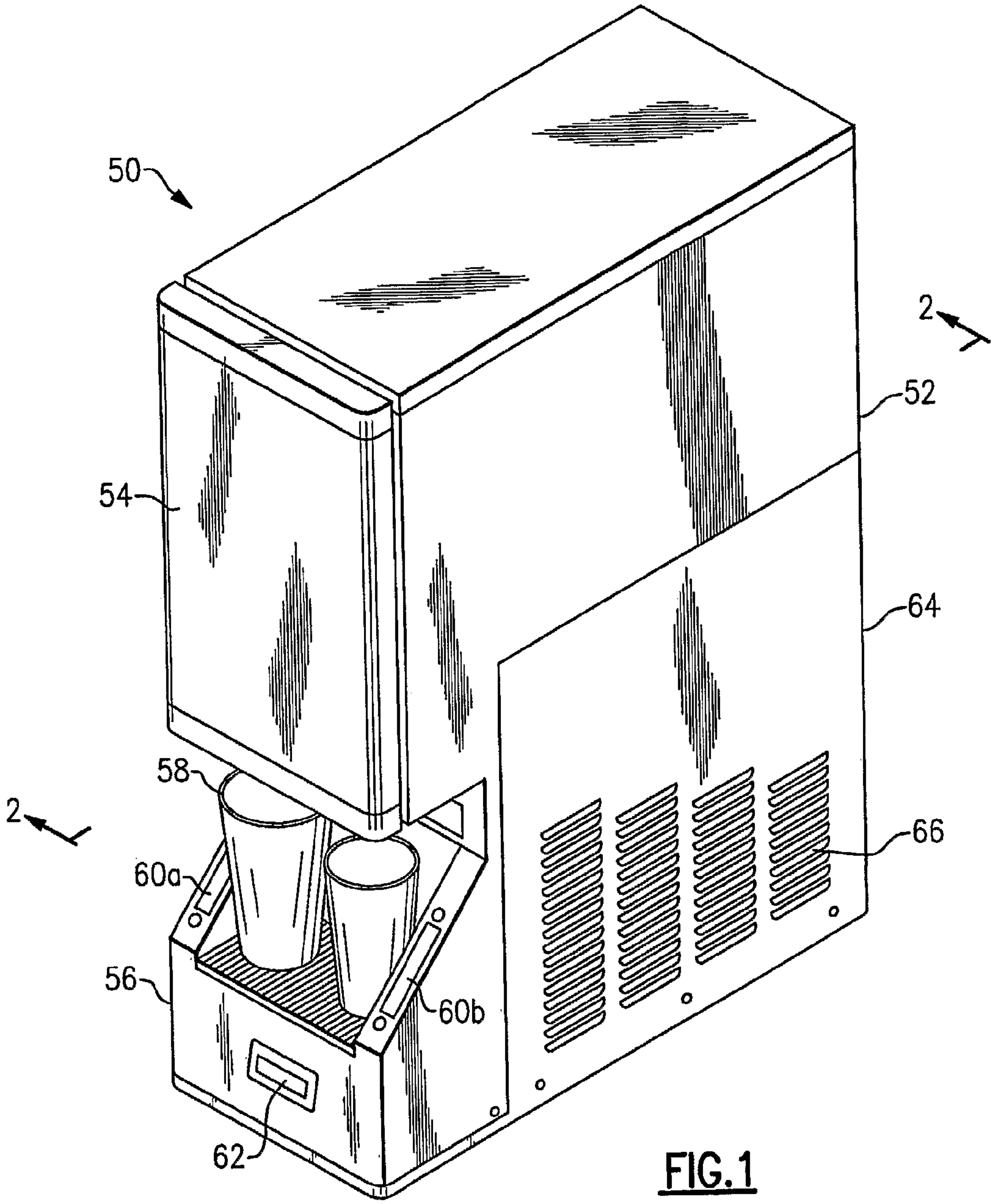
FIG. 1 is an illustration of a perspective view of the front, upper and left sides of a beverage dispenser according to an embodiment of the present invention.

Referring to FIG. 1, a postmix beverage dispenser 50 according to one embodiment of the present invention is illustrated. The beverage dispenser 50, viewed from outside, includes a housing 52 that has a hinged front door 54. The housing 52 further includes a platform or drip tray 56 for placing receptacles 58 such as cups of various sizes that receive the postmix products. Dispense buttons 60*a* and 60*b* may be situated at various locations on the housing 52 for an operator to initiate a dispensing cycle. In the particular embodiment illustrated in FIG. 1, one set of the dispense buttons, 60*a* or 60*b*, is situated on either side of the drip tray 56 to control dispensing of the product from either dispensing nozzle (not shown). To have the dispense buttons at a location other than the front door 54, makes it easier for wiring, and also the buttons remain visible and accessible to the operator while the front door 54 is open.

The dispensing buttons 60*a* and 60*b* may include, as in the example illustrated, buttons corresponding to various portion sizes, e.g., small, medium, large and extra large. The buttons may also include those that allow the operator to cancel/interrupt a dispensing cycle that has started, or to manually dispense while the button is pressed ("top-off" or "momentarily on"). They may also include lights that indicate the status of the machine. The dispensing buttons 60*a* and 60*b* may be back-lit to enhanced visibility, and may be part of a larger display (or interface) that provides further information on the dispenser.

Still referring to FIG. 1, a display 62, e.g., a liquid crystal display, is illustrated underneath the drip tray 56 and on the dispenser housing 52 for displaying information pertaining to the machine. Such information may include error messages, status, diagnostic messages, operational instructions, and so on. Similar to the dispense buttons, having the display 62 off the front door 54 can be advantageous in terms of wiring and functionality. Other parts of the dispenser housing 52 may include metallic panels 64 with slots 66 for air intake needed for the refrigeration system.

Figure 2:
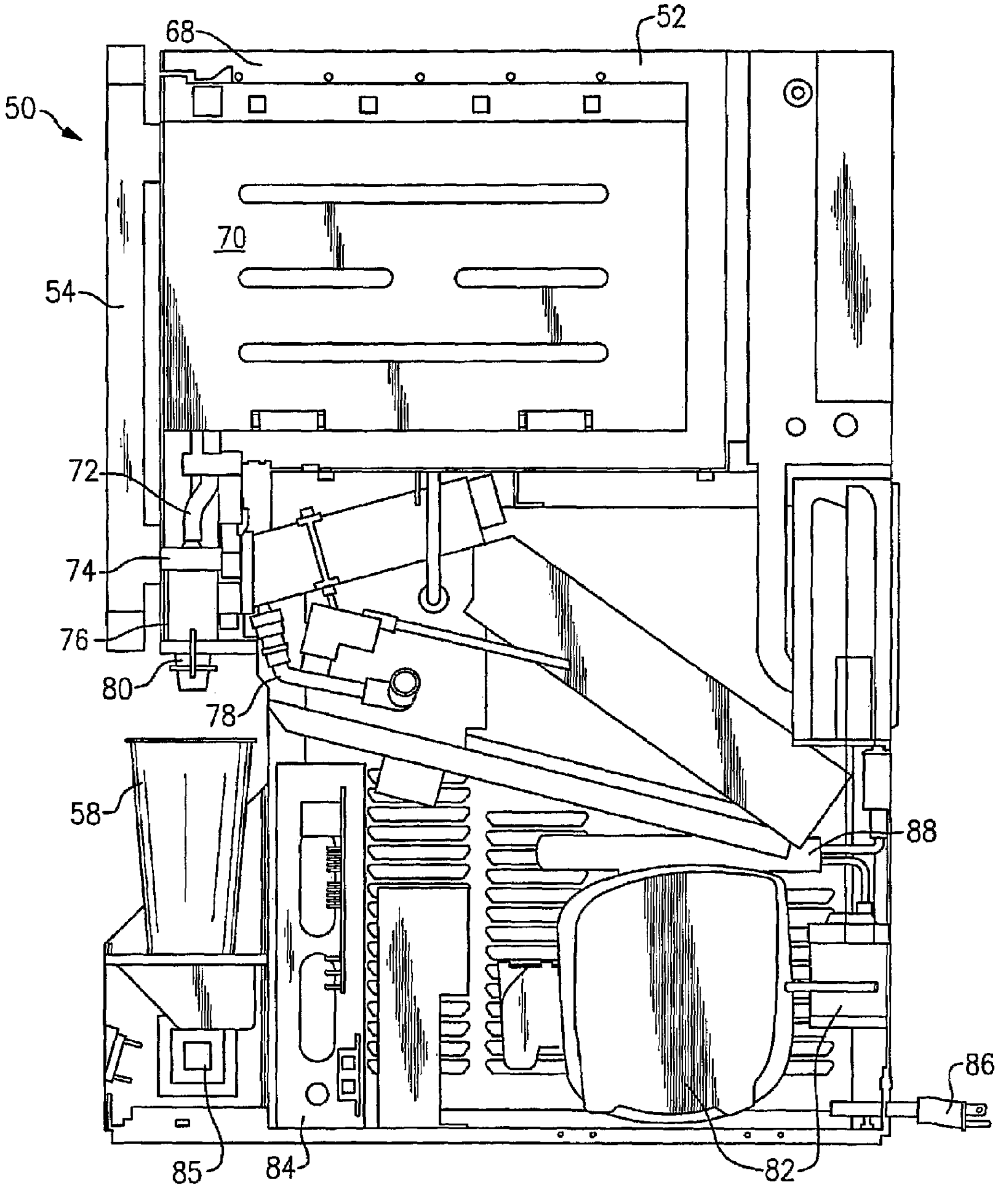
FIG. 2 is cut-away view largely along line 2-2 of FIG. 1.

Referring now to FIG. 2, a cut-away view of the dispenser 50 reveals its various inner parts. Inside the housing 52 and behind the front door 54 is a concentrate cabinet 68 (or compartment) for placing a prepackaged supply of concentrate and for mixing the concentrate with a diluent before dispensing. In one embodiment, the cabinet 68 houses at least one, preferably two, concentrate holders 70, one of which is shown in the drawing. A prepackaged supply (not shown) of concentrate (or additive, solute) is stored inside the concentrate holder 70 and a drainage tube 72 from the concentrate supply is fed into a concentrate delivery system 74, which in turn, delivers the concentrate into a mixing and dispensing system 76. Diluent (or solvent), typically a potable liquid, e.g., potable water, carbonated or non-carbonated, is supplied through a separate delivery system, e.g., a water delivery system 78, into the mixing and dispensing system 76. Postmix product is eventually dispensed through a mixing nozzle 80 into the receptacle 58.

Still referring to FIG. 2, the beverage dispenser 50 also includes a refrigeration system 82 that provides the necessary refrigeration to chill the concentrate cabinet 68 and water supplied through the water delivery system 78. In one embodiment, a control system 84 is provided to monitor, regulate and control the operation of various systems inside the dispenser 50, such as the refrigeration system 82, the concentrate delivery system 74, the water delivery system 78, and the mixing and dispensing system 76. The control system 84 may also provide error diagnostics for a service technician or operator.

A power switch 85 is located on the dispenser housing 52, specifically, outside of the drip tray 56 in the illustrated embodiment. A plug 86 at the back of the dispenser housing 52 connects systems that require power to an outside power source. Various parts, for example, of the water delivery system 78 and/or refrigeration system 82, are wrapped in insulation materials 88.

In a preferred embodiment, one beverage dispenser 50 contains at least two production lines such that most of the parts described above in reference to FIG. 2 are duplicated side-by-side in the same dispenser housing 52. For example, two sets of concentrate holders 70, concentrate delivery systems 74, parts of the water delivery systems 78, mixing and dispensing systems 76 may be manufactured to fit into one dispenser 50. The refrigeration system 82 is also bifurcated where necessary to chill both production lines. With two production lines, an operator has the choice of providing two different postmix products through the same dispenser. In one embodiment, the footprint or dimension of the dispenser 50 is no larger than about 11 inches (about 28.0 cm) wide, about 25 inches (63.5 cm) deep and about 55 inches (88.9 cm) tall. To save space, various individual parts inside the dispenser 50 may be designed as integrated modules to reduce extraneous connecting or sealing parts and to make it easier for service.

Features of the present invention are further illustrated by the following non-limiting examples.

Refrigeration System

Figure 3:
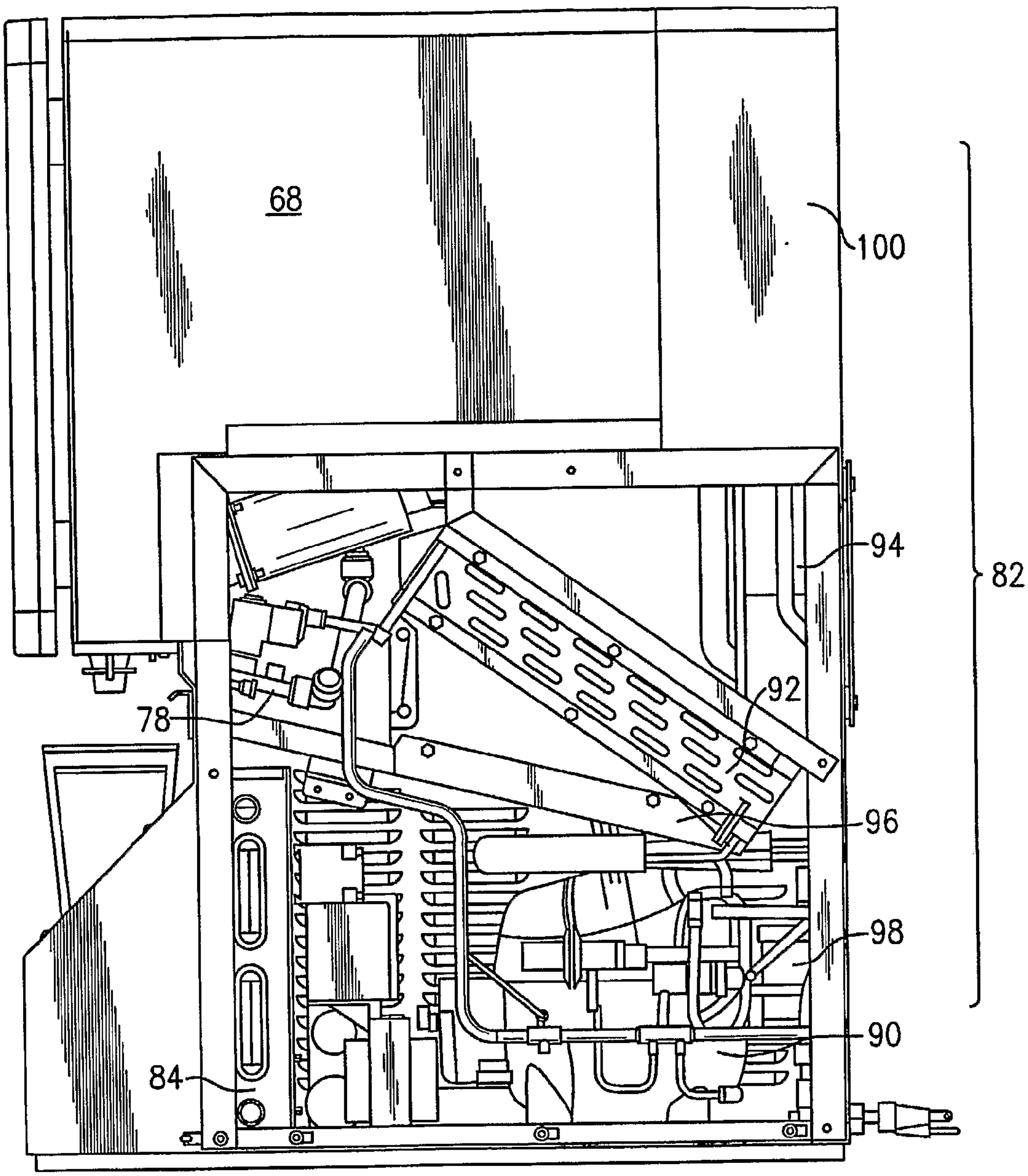
FIG. 3 is a cut-away view of an embodiment of a refrigeration system used in the dispenser of the invention.

Referring now to FIG. 3, an embodiment of the refrigeration system 82 according to the present invention is illustrated. In one embodiment, the refrigeration system 82 includes one or more evaporators, a compressor 90, a condenser 92, a fan 94, an air filter 96, a dryer 98, and one or more optional temperature sensors, parts generally known to one skilled in the art. Under the control of the control system 84, the refrigeration system 82 cools both the concentrate cabinet 68 and the water delivery system 78. In one embodiment, the control system 84 is programmed to prevent use of the refrigeration system 82 if the filter 96 is not installed. This prevents the fan 94 from engaging and, consequently, protects the condenser 92 from contamination by unfiltered air flow. A simple reed switch next to the filter 96 providing feedback to the control system 84 is able to accomplish this. Furthermore, in order to provide refrigeration to the water delivery system 78 on demand, the present invention includes a plate heat exchanger, for example, a brazed plate heat exchanger (BPHX) 100, in its refrigeration system 82.

Figure 4:
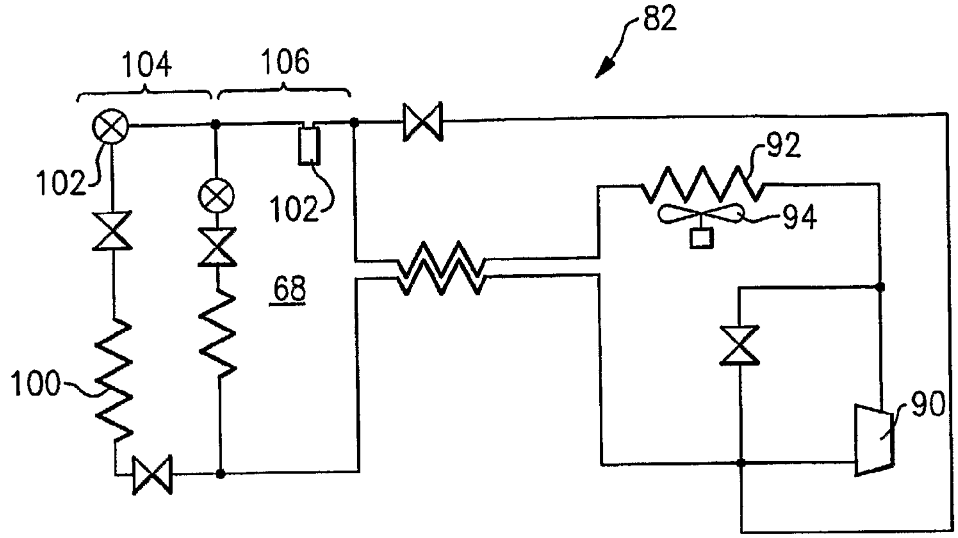
FIG. 4 is an illustration of a refrigerant circuit of the refrigeration system of FIG. 3.

An illustrative refrigerant circuit is shown in FIG. 4, where the refrigerant flows through the compressor 90, the condenser 92 next to the fan 94, and various valves 102 including solenoid valves that direct the flow of the refrigerant. The circuit includes a primary loop 104 that chills the water supply and a secondary loop 106 that chills the concentrate cabinet 68.

In one embodiment, the primary loop 104 lowers the water supply, e.g., a pressurized water supply at a flow rate of about 4 ounces (about 0.12 liters) per second or about 2 gallons (about 3.8 liters) per minute, by at least 5° F. (about 2.8° C.), or preferably, 10° F. (about 5.6° C.). And the secondary loop 106 keeps the concentrate cabinet at or below 40° F. (about 4.4° C.). In one feature, in order to guarantee almost instant chilling of the water supply, the primary loop 104 and the secondary loop 106 are never activated simultaneously—only one loop is being activated at any given time. And the primary water loop 104 always has priority over the secondary cabinet loop 106. In another feature, water from the beverage tower or a water booster/chiller system is channeled to flow in and out of the BPHX 100 for maximum efficiency in heat exchange.

Figure 5:
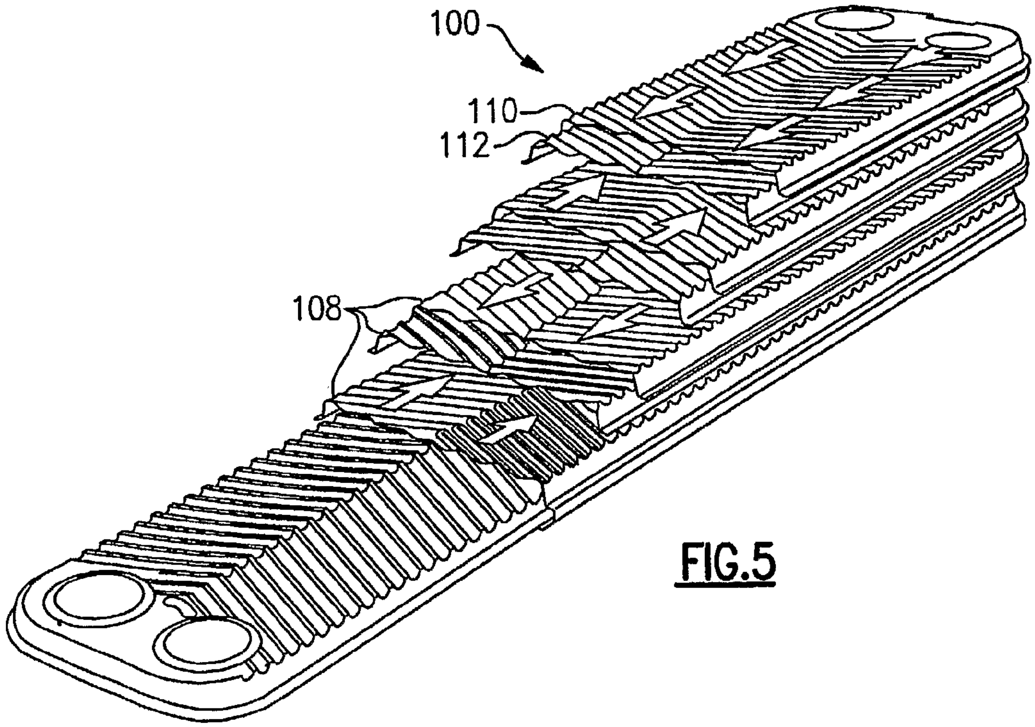
FIG. 5 is an exploded, cut-away view of a brazed plate heat exchanger used in an embodiment of the present invention.

Referring now to FIG. 5 where the BPHX 100 is illustrated in an exploded cut-away view. The BPHX 100 comprises multiple corrugated layers of thin stainless-steel plates 108 that are gasketed, welded, or brazed together. Such BPHX are commercially available, for example, from Alfa Laval Corporation. In one embodiment, the BPHX 100 is brazed with copper or nickel materials, and called copper brazed plate heat exchanger. In another embodiment, the BPHX 100 is a stainless steel brazed plate heat exchanger. The corrugated BPHX plates 108 provide maximum amount of heat-exchange surfaces as a water conduit 110 formed on one plate is situated next to a refrigerant conduit 112 formed in a neighboring plate.

Both the refrigerant and the water are controlled by solenoids such that the water will only flow through the BPHX 100 when the refrigerant is flowing, and vise versa, creating instant yet energy-conserving heat transfer. In one embodiment, water and refrigerant flow in a co-flow pattern, which means they both flow from one side of the exchanger, top or bottom, to the other. In a preferred embodiment, water and refrigerant flow in a counter-flow pattern, where warm water flows in from the top of the exchanger and cold refrigerant flows in from the bottom of the exchanger. As a result, as the water is chilled, it passes by even colder refrigerant as it progresses through the exchanger, forcing a rapid decrease in the water temperature. As a result, the refrigeration system of the present invention is capable of chilling a water flow on demand without the use of a cold reservoir such as an ice bank. In other words, the refrigeration system operates in an ice-free environment.

To prevent accidental freeze-up of the water circuit, the control system of the dispenser is programmed to prevent actuation of the refrigeration system before a sufficient amount of water has entered the circuit. For example, if the BPHX holds 12 ounces (about 0.35 L) of water, and it is determined that, from the point where water flow is measured (e.g., at a rotameter), at least 21 ounces (about 0.62 L) of water is needed to ensure the water conduit inside the BPHX is filled up, the control system will be programmed to mandate 21 ounces (about 0.62 L) of water has passed through the rotameter in each power cycle before energizing the primary water chilling loop of the refrigeration system.

Referring back to FIG. 4, the secondary cabinet loop 106 of the refrigeration system 82 can utilize any of the conventional refrigeration technique, e.g., the cold-wall technology, to chill the concentrate cabinet 68. Because the dispenser stores and makes products for consumption, it is important to maintain the concentrate cabinet 68 at a temperature that substantially inhibits growth of potentially harmful bacteria, e.g., at or below 40° F. (about 4.4° C.). In one embodiment, the secondary cabinet loop 106 utilizes a capillary tube refrigerant control scheme since the load on the system is fairly constant.

Diluent Delivery System

Figure 6:
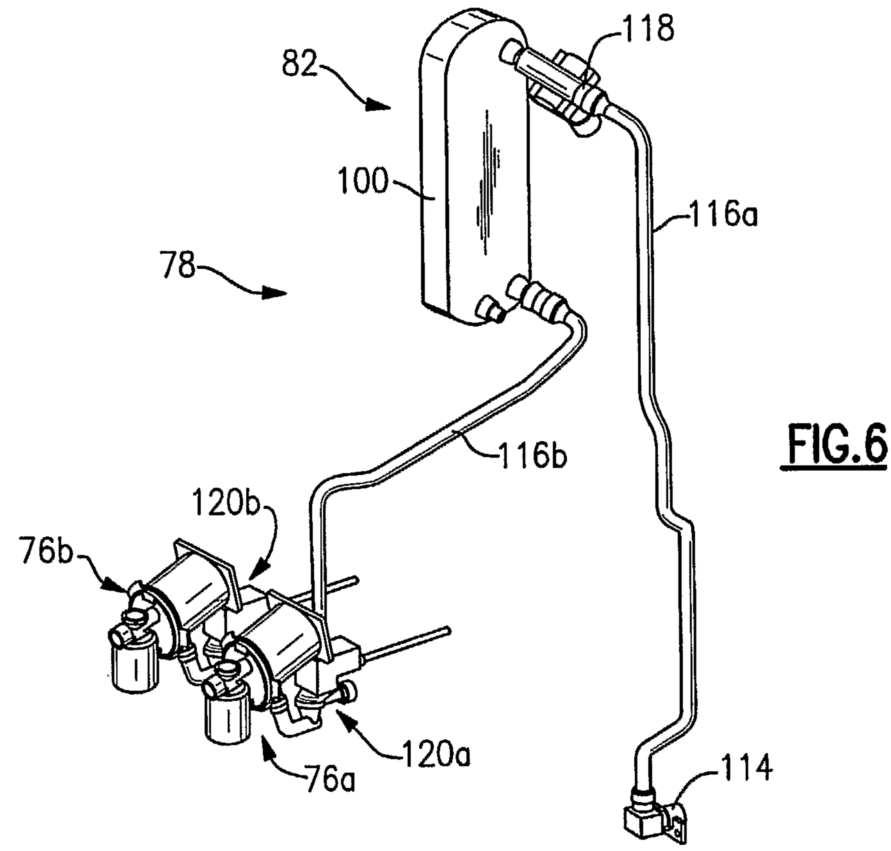
FIG. 6 is a perspective view of an embodiment of the water delivery system that may function inside the dispenser depicted in FIG. 1.

Referring to FIG. 6, an embodiment of the water delivery system 78 is illustrated. Potable water is introduced into the delivery system 78 at an inlet 114 at the back of the dispenser.

The inlet 114 is fitted to allow a 0.5 inch (1.27 cm) NPT (National Pipe Tap) inlet connection to an outside source of water supply, e.g., an in-store water chiller/booster system. The incoming water may be boosted, e.g., to about 20 to 100 psi (pound per square inch), and pre-chilled to about 45° F. (about 7.2° C.). The water deliver system 78, in one embodiment, provides pressurized water flow as the master in a "master-follower" mixing system. Such a system regulates the rate of delivery for the follower, the concentrate in this case, based on that of the master, water in this case, and therefore, only actively adjusts the rate for one of two ingredients. The water delivery system 78 may also, in corroboration with the refrigeration system 82, provides further chilling of the incoming water, e.g., by an additional 5° F. (about 2.8° C.) to 40° F. (about 4.4° C.). For that reason, parts or all of the water delivery system 78, including water conduits 116*a* and 116*b*, are insulated.

Still referring to FIG. 6, the water delivery system 78 continues as water conduit 116*a* passes through an optional pressure regulator 118. The pressure regulator 118 may adjust the water flow to a desired pressure and flow rate, e.g., less or at about 30 psi and about 2 gallons (about 3.8 L) per minute. Pressure-adjusted water is then fed into part of the refrigeration system 82, specifically, the BPHX 100. Further chilled water exits the BPHX 100 into the conduit 116*b*. Because the illustrated embodiment has two production lines from two sources of concentrate supply, water is bifurcated here and flows into two flowmeter assemblies 120*a* and 120*b* before entering respective mixing and dispensing systems 76*a* and 76*b*, and dispensed as part of the final products eventually.

Figure 7:
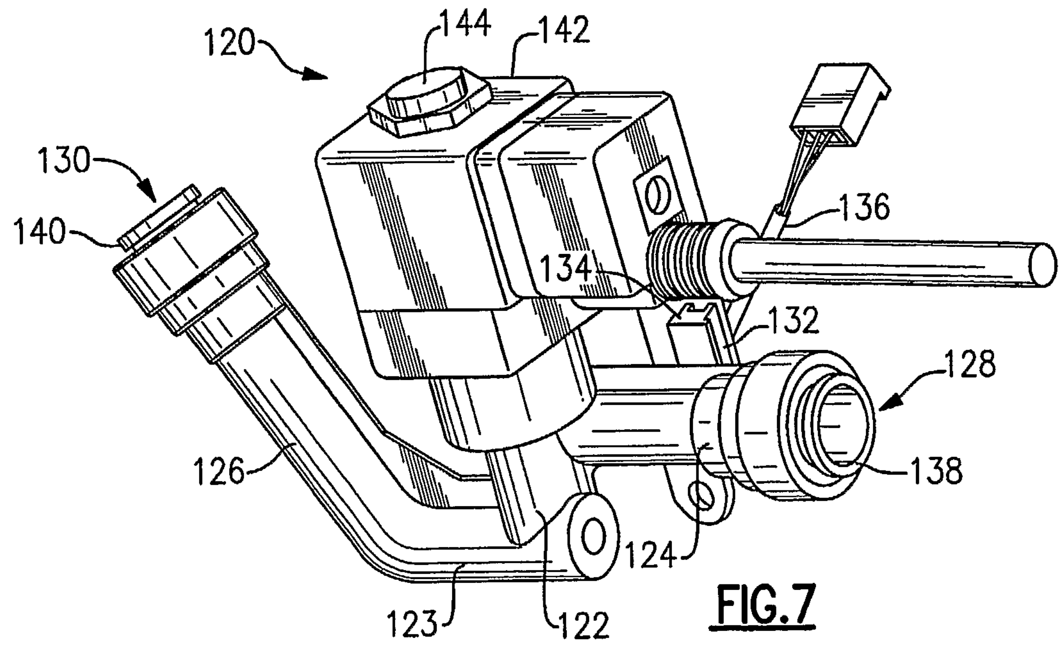
FIG. 7 is a perspective view of a flowmeter assembly according to an embodiment of the present invention.

Referring now to FIG. 7, the flowmeter assembly 120 is designed to minimize extraneous parts, connectors and fixtures while combining the functions of flow control and monitoring into one assembly. In one embodiment, the flowmeter assembly 120 includes a manifold 122 inside an integral housing 123 that has a first arm 124 and a second arm 126. The first arm 124 provides at least one inlet port 128 for fluid input, and the second arm 126 provides at least one outlet port 130 for fluid output. The inlet port 128 is in fluid communication with the outlet port 130 through a bore (not shown). The orientation of the second arm 126 determines the direction of fluid output. In one embodiment, the second arm 126 is constructed along an axis that is about 45 to 60 degrees to the axis of the first arm 124.

Referring still to FIG. 7, a flowmeter or rotameter (not shown) is embedded or otherwise integrated in the first arm 124 of the manifold housing 123, downstream to the inlet port 128 and upstream to the outlet port 130. The flowmeter responds to any fluid flow by generating an analog output signal indicative of the rate of the fluid flow. Next to the flowmeter on the first arm 124 is an adapter 132 configured and sized for a flowmeter sensor 134 to fit in its groove. The flowmeter sensor 134 senses the output signal generated by the flowmeter and relays through wiring 136 to a control system. The control system uses this information to set the pace of a concentrate pump to achieve a desired concentrate ratio as explained in a subsequent section. To ensure accurate reading, upstream to the flowmeter, an optional pressure-compensated flow control valve (not shown) may be incorporated in the first manifold arm 124 to regulate water flow into the flowmeter. The pressure-compensated flow control valve is preferably a one-way valve. Additionally, another one-way valve, e.g., a check valve (not shown), may optionally be embedded in the second housing arm 126 to prevent any substantial fluid flow back toward the flowmeter. Backflow from the mixing system may contaminate the flowmeter and prevent it from proper functioning.

Still referring to FIG. 7, in order to minimize the amount of connecting parts in the water delivery system, the ports of the flowmeter assembly 120 are equipped with furnishings that allow the assembly to sealingly receive upstream and downstream conduits, preferably of a standard size, e.g., 0.5 inch (1.27 cm) in diameter. Specifically, the inlet port 128 and the outlet port 130 are furnished with connector assemblies 138 and 140, respectively.

The flowmeter assembly 120 further includes a gate-keeping valve, e.g., a solenoid valve 142 sealingly fastened to the manifold housing 123 and situated downstream to the flowmeter and upstream to the outlet port 130. The solenoid valve 142 is capable of shutting off and reopening the water flow, and is needed to control water flow from the BPHX to the mixing system. In the illustrated embodiment, the solenoid valve 142 is pre-fabricated and then fastened onto the manifold housing 123 though a screw 144.

Figure 8:
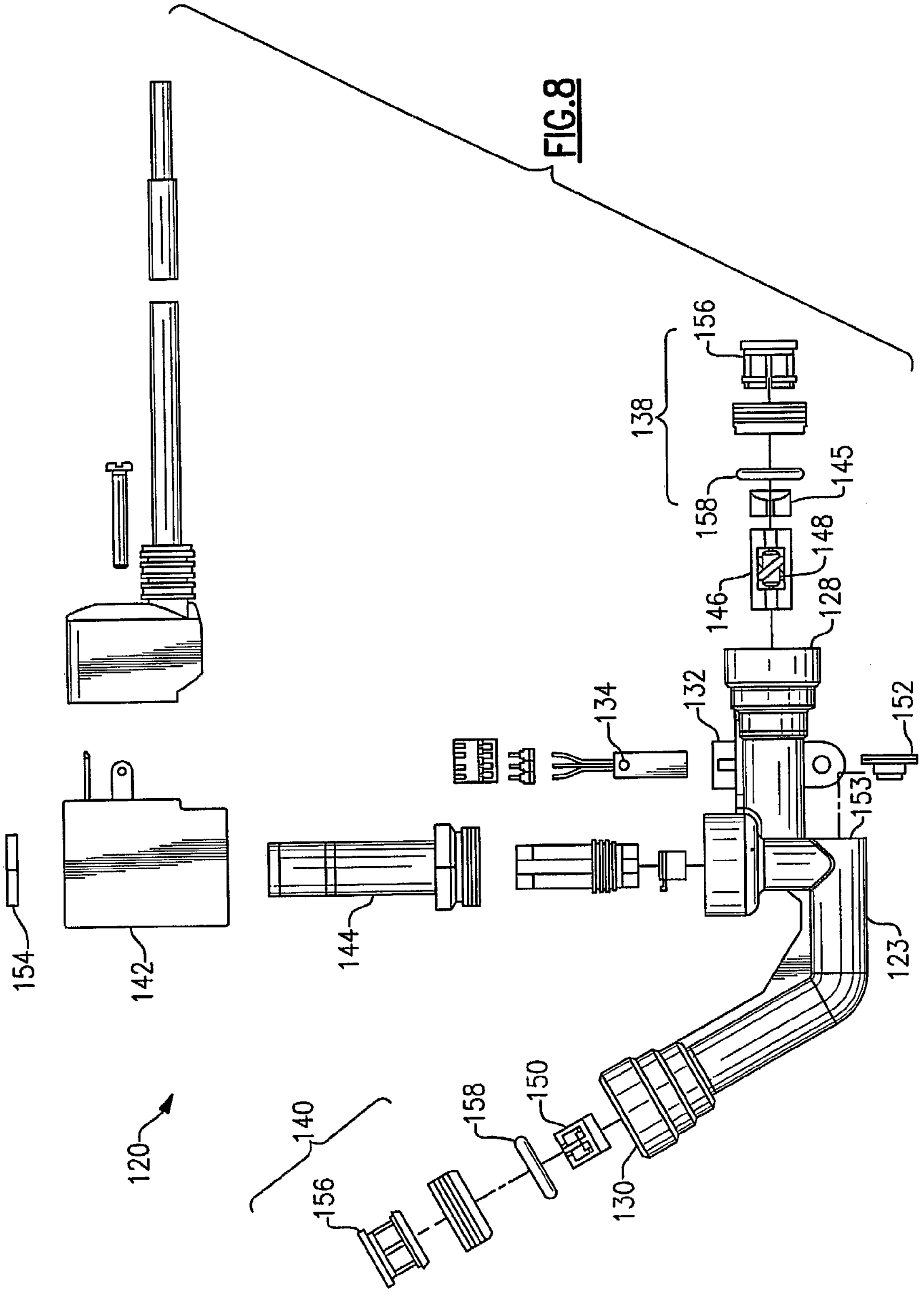
FIG. 8 is an exploded side view of the flowmeter of FIG. 7.

Referring now to FIG. 8, more details of the flowmeter assembly 120 are illustrated in an exploded view. To manufacture the assembly 120, in one method, a pressure-compensated flow control valve 145, a flowmeter 146 with a turbine 148, and a check valve 150, all commercially available, are provided. Then, the manifold housing 123 can be fabricated, e.g., through injection molding using an NSF-listed food-grade thermoplastic, while assembling therein the pressure-compensated flow control valve 145, the flowmeter 146, the check valve 150, arranged sequentially down a fluid flow along the bore of the manifold. For the particular manifold configuration illustrated herein, a port plug 152 is used to seal up a reserve port 153 on the housing 123. A commercially available solenoid valve 142 is then fastened to the manifold housing 123 through a two-way bolt screw 144 and a top nut 154.

Still referring FIG. 8, connector assemblies 138 and 140 may be furnished to the inlet port 128 and the outlet port 130, respectively, after the manifold housing 123 has been fabricated. In one embodiment, the connector assembly is a quick disconnect fitting, and may include an expandable member configured to fit inside the port for sealingly receiving a connective conduit. As illustrated herein, each of the connector assemblies 138 and 140 may include a barbed expandable member 156 with an external o-ring 158 for sealing. In one embodiment, the expandable member 156 comprises multiple extensions arranged in a circle and separated by slots. For example, this kind of connector assembly is commercially available from Parker Hannifin Corporation of Ravenna, Ohio, under the trademark TrueSeal. Again, a flowmeter sensor 134 can be fastened to the flowmeter assembly 120 through an adapter structure 132 on the manifold housing 123.

By integrating multiple components such as the pressure-compensated flow control valve, the flowmeter (and/or its sensor adapter), the solenoid valve, and the check valve into one manifold-based assembly, the present invention economizes all these parts into one easily serviceable assembly with only two openings. Further, the assembly is designed such that those limited number of openings can be furnished with connectors than can sealingly connect to other conduits though simple axial motions without the help of any tools, further enhancing serviceability. An integrated assembly also makes it easier to fabricate closely-molded insulation wrap or casing around it.

Concentrate Delivery System

Figure 9:
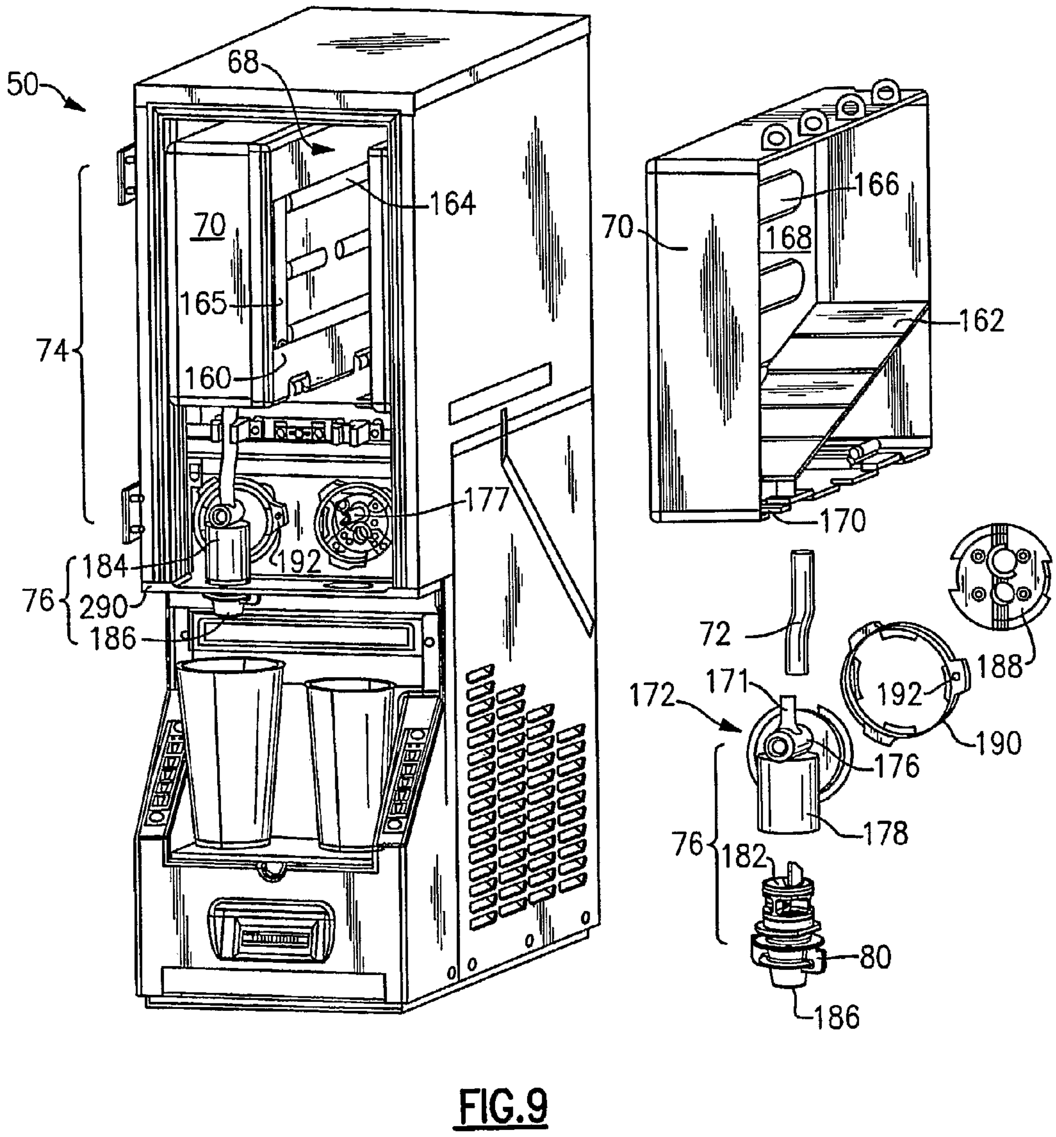
FIG. 9 is a perspective view of the dispenser embodiment depicted in FIG. 1 with its front door removed and with part of the production line inside the dispenser in an exploded view on the right.

Referring to FIG. 9, in one embodiment of the invention, the concentrate delivery system 74 delivers the concentrate from a reservoir into the mixing and dispensing system 76 where the concentrate meets the diluent, e.g., potable water, and the two are blended together before being dispensed. FIG. 9 shows the dispenser embodiment 50 of FIGS. 1 and 2 with the front door removed, and one of the two parallel production lines is depicted in a partly exploded view.

The concentrate, which may be liquid or semi-liquid and may contain solid components, e.g., juice or syrup concentrates with or without pulp, slush, and so on, is loaded into the concentrate cabinet 68 in a package. The package may be a flexible, semi-rigid or rigid container. A concentrate holder 70 may be provided to accommodate the concentrate package. In one embodiment, the concentrate holder 70 is a rigid box with a hinged lid that opens to reveal a ramp 162, separate or integrated with the holder housing, to aid drainage of the concentrate from its package. The ramp 162 can be flat or curved for better accommodation of the package. The concentrate holder 70 may also have corresponding ridges 164 and grooves 166 on its housing, e.g., the lid 160 and its opposite side 168, to aid stacking and stable parallel placement. The concentrate holder 70 may also have finger grips or handles that are easily accessible to an operator from the front of the concentrate cabinet 68 to aid the holder's removal. For example, a vertical groove 165 near an edge of the holder 70 could serve that function.

Figure 10:
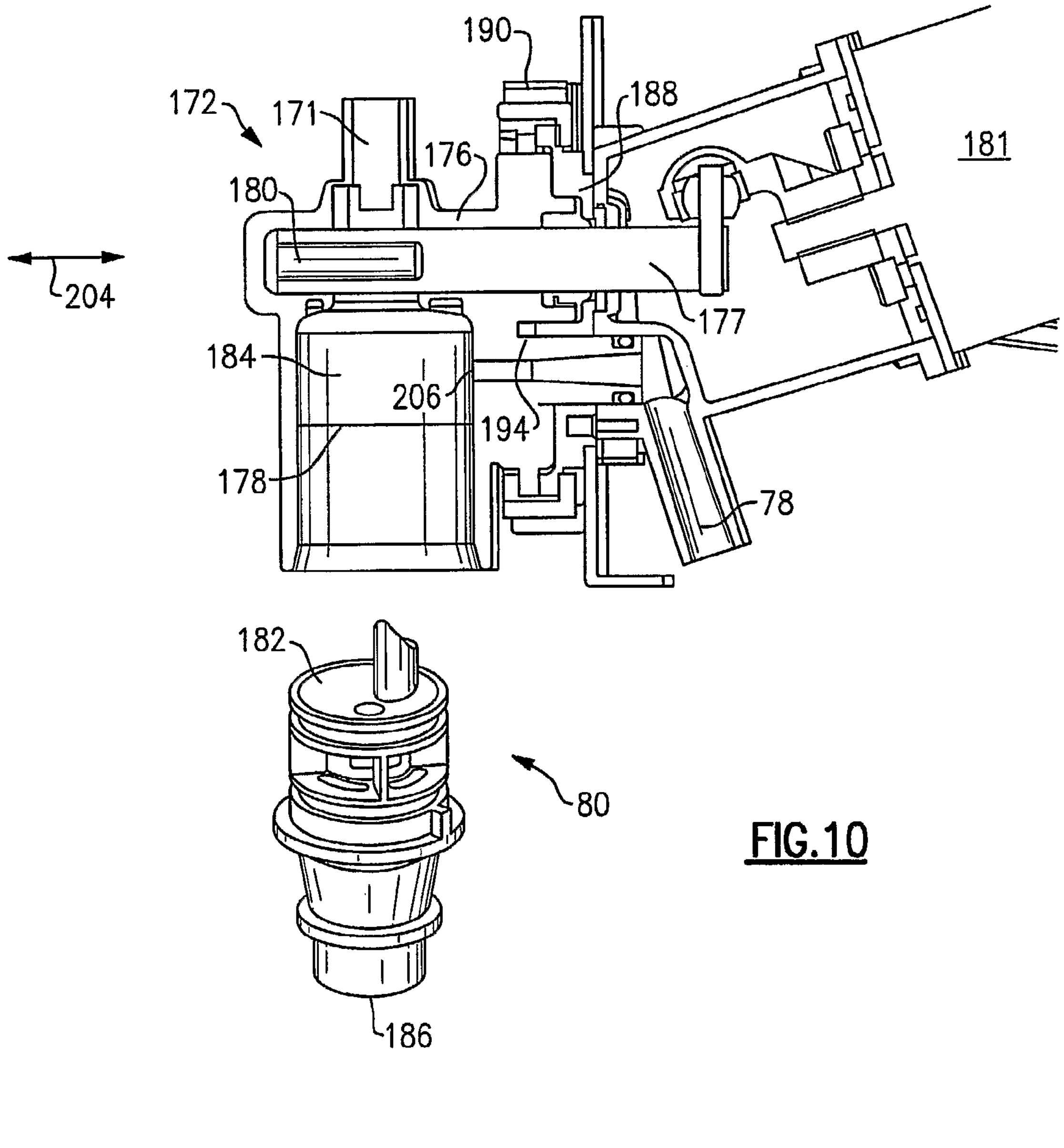
FIG. 10 is a cut-away view of part of the concentrate delivery system depicted in FIG. 9 and a perspective view of the mixing nozzle depicted in FIG. 9 before it is placed inside the mixing housing.

Referring to both FIGS. 9 and 10, the concentrate package comes with a drainage tube 72 that is lodged in an opening 170 at the bottom of the concentrate holder 70. The concentrate holder 70 may include a protrusion or similar structure to facilitate the locking of the drainage tube 72 in a preferred locking position in the opening 170 to prevent kinking or misalignment that hinders pump operation. Further, such a locking position may ensure proper functioning of a sensor that monitors the liquid flow inside the drainage tube. The drainage tube 72 extends out of the concentrate holder 70 and is attached to a tube adapter 171 on the top of a pump head 172. Underneath the tube adapter 171 is an elongated cylindrical piston housing 176 inside which a piston 177, actuated by a rotary shaft (not shown) powered by a motor 181, moves to transfer the concentrate from the tube adapter 171 to a mixing housing 178. Inside the mixing housing 178 are portions of a mixing nozzle 80 of which the top surface 182 forms a mixing chamber 184 with the top inner surface of the mixing housing 178. Water is also delivered into the mixing chamber 184 where mixing takes place. The reconstituted product is then dispensed through the discharge outlet 186 of the mixing nozzle 80.

Still referring to both FIGS. 9 and 10, the pump head 172 is mounted onto an adapter plate 188 through a locking ring 190. In one embodiment, the locking ring 190 has a feedback structure that ensures the locking ring 190 is in the proper locking position. As a result, the dispenser machine 50 is not energized unless the pump head 172 and the locking ring 190 are properly assembled. An example of such a feedback structure is a magnet 192 that activates a reed switch 194 (FIG. 10) placed behind the adapter plate 188 at a position that corresponds to the proper locking position of the magnet 192.

Figure 11:
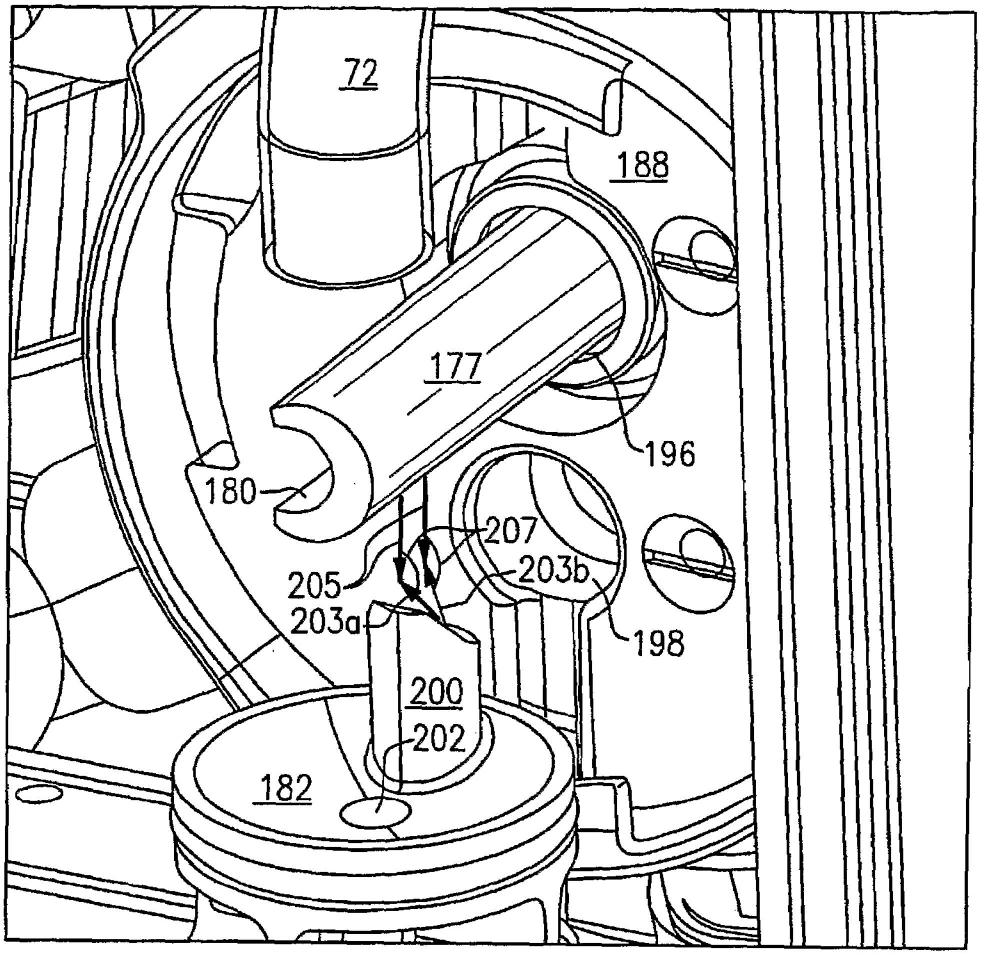
FIG. 11 is a detailed, perspective view of a concentrate discharge tube, a piston, and the mixing nozzle in their assembled positions according to the embodiment depicted in FIG. 9.
Figure 12:
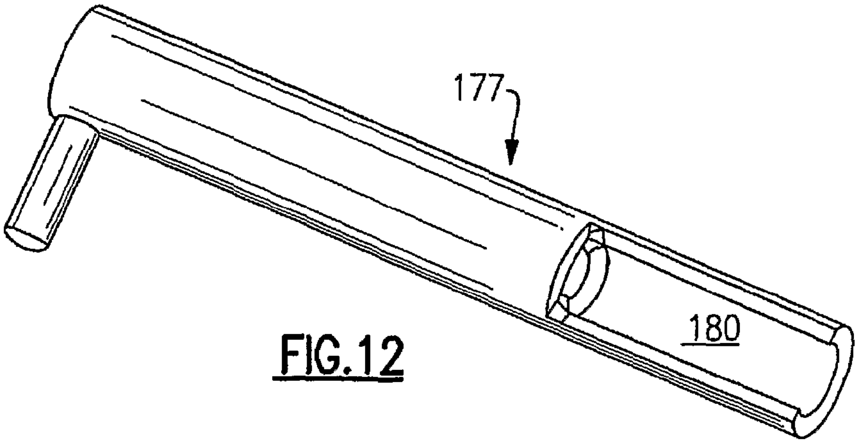
FIG. 12 is a perspective view of the side and the top of an embodiment of the piston.

Referring now to FIG. 11, in a more detailed view, the piston 177 is shown to extend out of an upper opening 196 of the adapter plate 188. The piston 177 has a U-shaped depression 180 (better illustrated in FIG. 12) that temporarily holds concentrate during its operation. Still referring to FIG. 11, as the piston 177 transfers the concentrate from the drainage tube 72 towards nozzle top surface 182, pressurized and chilled water is forced out of a lower opening 198 of the adapter plate 188 to mix with the concentrate. The blended product then flows through an opening 202 in the nozzle top surface 182.

According to one feature of the invention and referring back to FIG. 10, the piston 177 is, for example, part of a positive displacement pump, e.g., a nutating pump or a valveless piston pump, such as those commercially available from Miropump Incorporated of Vancouver, Wash. Nutation is defined as oscillation of the axis of any rotating body. Positive displacement pumps are described in detail in co-owned U.S. application Ser. No. 10/955,175 filed on Sep. 30, 2004 under the title "Positive Displacement Pump" and its entire disclosure is hereby incorporated by reference wherever applicable. The depicted nutating pump is a direct drive, positive displacement pump used to move liquid from a starting point, in this case, the tube adapter 171, to a destination, here, the mixing chamber 184. The piston 177 is configured to rotate about its axis, so that its U-shaped depression 180 faces upward towards the tube adapter 171 to load the concentrate and faces downward towards the mixing chamber 184 at the end of one cycle to unload its content. Meanwhile, the piston 177 also oscillates back and forth in the direction indicted by the arrow 204, providing additional positive forces to transfer the concentrate.

One advantage for employing positive displacement pumps such as a nutating pump or a valveless piston pump as opposed to progressive cavity pumps or peristaltic pumps is the enhanced immunity to wear or variation in concentrate viscosity. Prior art pumps often suffer from inconsistency in delivery due to machine wear or the need for a break-in period; they also face low viscosity limits because concentrates of higher viscosity requires greater power in those pumps. In contrast, positive displacement pumps can deliver, with consistency and without the need for speed adjustment, concentrate loads over a wide range of viscosities. Accordingly, to deliver a predetermined amount of concentrate, one only needs to set the pump speed once.

In one embodiment, the pump is equipped with an encoder to monitor the number of piston revolutions—e.g., each revolution may be equal to 1/32 of an ounce (about 0.0009 L) of the concentrate. The encoder may be placed on the rotary shaft of the pump motor to count the number of revolutions the piston has turned in relation to the water flow. The number of pump revolutions is dictated by the control system based on two pieces of information: a predetermined, desired mix ratio between the concentrate and the water, and the amount of water flow sensed by the flowmeter assembly described above.

Still referring to FIG. 10, optionally, the controller system may be programmed to ensure that the pump piston 177 is returned to the intake position at the end of each dispense operation. By having the piston positioned at the intake stroke with its U-shaped depression facing upward, the entry point to the mixing chamber 184 for the concentrate will be completely sealed to prevent any leakage of concentrate. This also allows water, which enters the mixing chamber 184 at the port 206 from the water delivery system 78, to flush and clean the outlet of the pump and the mixing chamber 184 during and after each dispensing cycle.

Mixing and Dispensing System

The mixing and dispensing system 76 provides a common space for the concentrate and the diluent to meet and blend. The mixing and dispensing system 76 also includes parts that facilitate the blending. Referring back to FIG. 9, in one embodiment, the mixing and dispensing system 76 includes the mixing housing 178 and the mixing nozzle 80. As described earlier, top portions of the mixing nozzle 80 fit into the mixing housing 178 and forms the mixing chamber 184 (FIG. 10) therebetween. In one embodiment, the mixing housing 178 is fabricated as part of the pump head 172.

Referring now to FIG. 11, according to one feature of the invention, a barrier structure or diverter 200 on the nozzle top surface 182 faces an incoming diluent stream and forces the diluent to spray into an incoming concentrate stream being unloaded by the piston 177. In an example where the diluent is water, the incoming water stream enters the mixing chamber through a lower plate opening 198 and then a water entry port 206 (FIG. 10) in the mixing chamber housing 178 (FIG. 10). The turbulence created by the redirected water flow continues through the entire dispensing cycle and effectively produces an evenly and thoroughly blended mixture of the concentrate and the water.

The mixture then flows through the opening 202 in the nozzle top surface 182 and passes through the rest of the mixing nozzle 80 before emerging out of the discharge outlet 186 (FIG. 9). In one embodiment, a mixture of concentrate and water is kept in the mixing chamber after dispensing a requested product for a "top off" operation.

Figure 13B:
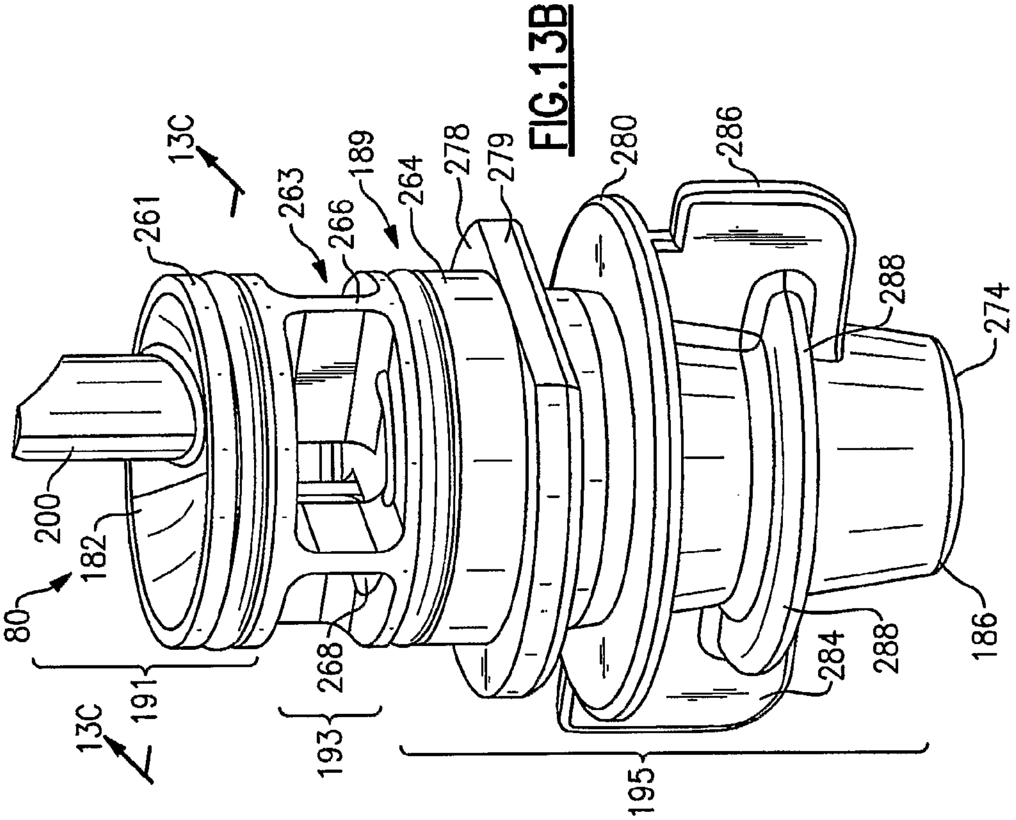
FIG. 13B is another perspective view of the side of the mixing nozzle depicted in FIG. 13A.
Figure 13A:
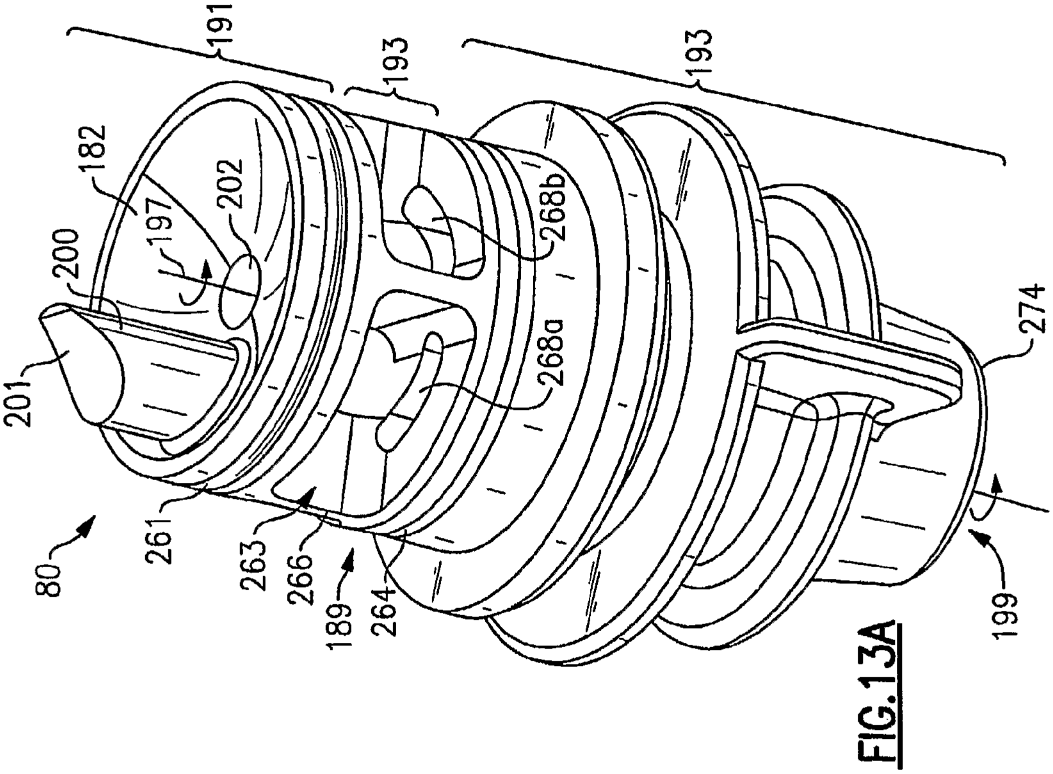
FIG. 13A is a perspective view of the side and the top of an embodiment of a mixing nozzle.
Figure 13C:
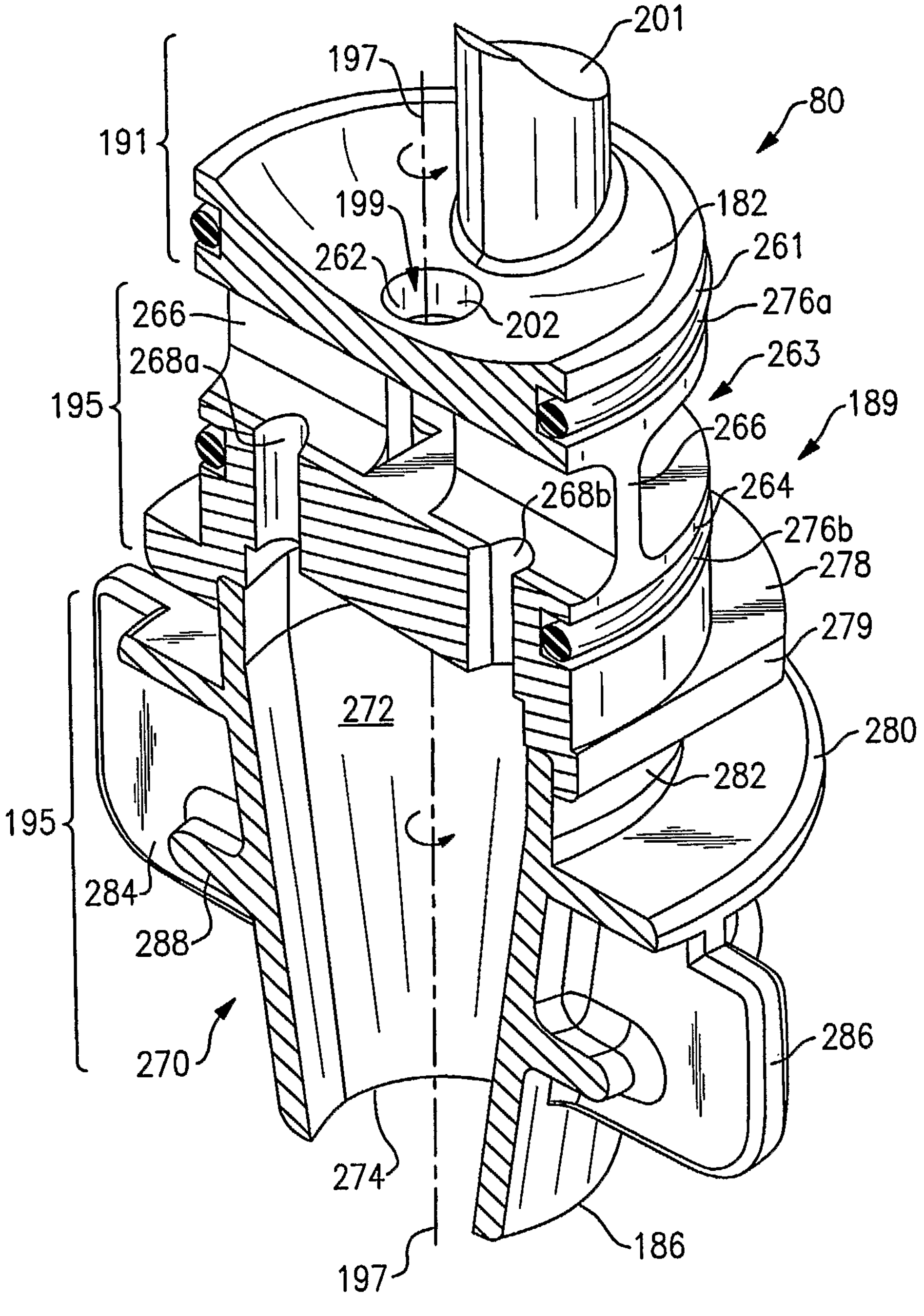
FIG. 13C is a cross sectional view of the embodiment shown in FIG. 13B along the line 13C-13C.

FIGS. 13A, 13B, and 13C depict one embodiment of the mixing nozzle 80 according to the invention. A nozzle body 189 has an inlet section 191, an outlet section 195 and a depressurizing section 193 in between. The nozzle body 189 extends along a rotational axis 197, and defines a liquid passageway 199 from the inlet section 191 to the outlet section 195. The inlet section 191 consists of a nozzle top 261 and the barrier structure or diverter 200 thereon. The depressurizing section 193 consists of a depressurizing chamber 263 in between the nozzle top 261 and a chamber floor 264. The depressurizing chamber 263 may be partitioned, in part, by multiple walls 266 into multiple chambers. In each chamber, there is an elongated diffusion slot 268 on the chamber floor 264 near the floor's periphery. There can be any number, e.g., four, of these diffusion slots, and two of them, labeled 268*a* and 268*b*, are depicted in the drawings. Compared to the inlet opening 202, these diffusion slots 268 are farther away from the nozzle axis 197 to direct the liquid flow towards the nozzle periphery.

Still referring to FIGS. 13A to 13C, the diffusion slots 268 lead into a funnel 270 (best viewed in FIG. 13C) defined by the nozzle outlet section 195. A funnel, as used herein, refers to a structure that defines a passage where the cross section of one end is larger than the other; a funnel's diameter may continually taper toward one end, or the tapering may be interrupted by sections where the diameter is unchanged. In the illustrated embodiment, the funnel 270 includes an inner wall 272 that, from the top to bottom, have a constant diameter at first, and then continually tapers toward the edge 274 of the discharge outlet 186.

Specifically referring to FIG. 13C, the nozzle's liquid passageway 199 begins at the inlet opening 202 on the nozzle top surface 182. The nozzle top surface 182 serves as the floor of the mixing chamber when the nozzle body 189 is partly inserted in the mixing housing. While the nozzle top surface 182 can be flat, in a preferred embodiment, it is slightly curved with the inlet opening 202 at the lowest point of the floor to aid gravitational drainage. The initial portion of the nozzle passageway 199 is an inlet channel 262 of constant diameter that extends from the inlet opening 202 through the nozzle top 261 and into the depressurizing chamber 263. In one embodiment, the inlet opening 202 is designed to be fairly restricted compared to the size of the nozzle top surface 182, so that when the postmix product flows through the inlet channel 262 and enters the depressurizing chamber 263, the substantial increase in the average cross-sectional area of the liquid passageway 199 greatly reduces the pressure and hence the momentum of the liquid flow. The pressure drop induced by the depressurizing chamber 263 serves to reduce splashing in dispensing the product. In one embodiment, the depressurizing chamber 263 has a cross-sectional area that is at least 20 times, preferably 50 times, and more preferably 100 times larger than that of the inlet channel 262. In one embodiment, the inlet opening 202 has a diameter of 0.125 inches (about 3.2 mm) and the depressurizing chamber 263 has a diameter of 1.375 inches (about 3.5 cm), therefore an 121 times increase in cross-sectional area.

Both the nozzle top 261 and the chamber floor 264 have a groove around its periphery that each accommodates an o-ring 276*a*/276*b*. The O-rings seal against the inside of the mixing housing when the nozzle body 189 is locked in.

Still referring to FIG. 13C, the last portion of the nozzle passageway 199 consists of the funnel 270. The diffusion slots 268 that lead to the funnel can be of a variety of shapes, including oval, kidney bean-shaped, circular, rectangular, fan-shaped, arc-shaped and so on. The diffusion slots 268 are situated along the edge of the chamber floor 264 to direct the product flow toward the inner funnel wall 272. As the product streams down the funnel wall 272 as opposed to free fall in the middle of the passageway 199, splashing is further reduced. The increase in cross-sectional area of the flow path as it enters from the diffusion slots 268 into the funnel 270 also tend to slow down the flow. The shape of the funnel 270 as a large portion of it continually tapers down towards the bottom edge 274 also tends to create a spiral flow pattern as the flow is re-centered toward the nozzle axis 197. A centered product stream makes it easier to receive the entire product in the waiting receptacle.

Sections of the nozzle body 189 as well as other distinct structures described herein may be fabricated separately and assembled before use, or, fabricated as one integrated piece. The nozzle body 189 should be sized such that at least the inlet section 191 and the depressurizing section 193 fit into a nozzle housing, e.g., the mixing housing 178 (FIG. 10). The nozzle may be manufactured in a variety of food-safe materials, including stainless steel, ceramics and plastics.

Referring back to FIGS. 13A, 13B, and 13C, the diverter 200 provides an elevated blocking surface 201 that redirects an incoming water stream. The diverter 200 is depicted as substantially cylindrical, but one skilled in the art understands that it can be of any of a variety of geometrical shapes. The blocking surface 201 is designed to maximize contact between water and the concentrate. In this case, it changes the direction of a pressurized water stream so that the water stream meets the incoming concentrate stream head on, i.e., the two streams meet at a degree close to 180 degrees, or at an obtuse angle. Referring back to FIG. 11, the blocking surface 201 creates a spray pattern as it redirects water so that water molecules bounce off the surface in a variety of directions as illustrated by arrows 203*a* and 203*b*. The incoming concentrate stream moves generally in the direction of gravitational fall as indicated by arrow 205. The two streams meet at an angle 207. In one embodiment, the angle 207 is more than 90 degrees, and preferably, more than 120 degrees.

The blocking surface 201 may be of a variety of geometry, even or uneven, uniform or sectioned. For example, the blocking surface 201 may be concave or convex, corrugated, dimpled, and so on. In the illustrated embodiment, the blocking surface 201 is a concave surface such that a wide, thin, powerful spray patter of diverted water is generated that cuts into the concentrate stream, and creates turbulent flow pattern inside the mixing chamber. This turbulent pattern results in a uniformly blended product that is then forced into the opening 202 on the nozzle top surface 182. The edge of the blocking surface 201 may be sharp or blunt. In one embodiment, to avoid injury to the operator, the top of the diverter 200 is flattened or rounded.

To ensure that the blocking surface 201 substantially faces the water stream coming into the mixing chamber, i.e., that the nozzle body 189 is locked in a predetermined orientation inside the mixing chamber, certain locking features may be added to the nozzle. Referring to FIGS. 13B and 13C, in one embodiment, the blocking surface 201 is situated asymmetric about the nozzle axis 197, therefore, a locking structure that is also asymmetric about the nozzle axis 197 is provided to orient the nozzle. In one embodiment, such locking structure includes an asymmetric collar that is integrated with the nozzle body 189. Specifically, the asymmetric collar can be a D-shaped collar 278 situated between the chamber floor and a middle collar 280, and having a flat side 279. There is a locking groove 282 between the D-shaped collar 278 and the middle collar 280 that will engage an adapter panel as described hereinbelow. Both the D-shaped collar 278 and the middle collar 280 are preferably integrated with the rest of the nozzle body 189.

Still referring to FIGS. 13B and 13C, another locking structure can be a set of projections that extend along the nozzle axis 197. In one embodiment, the projections are a pair of wing-like handles 284 and 286 that occupy different latitudinal spans along the outside of the nozzle body 189. The locking handle 284 extends from just below a lower collar 288 upward and terminates level to the top of the middle collar 280. The regular handle 286 also extends from just below the lower collar 288 upward, but terminates below the top of the middle collar 280.

Figure 14A:
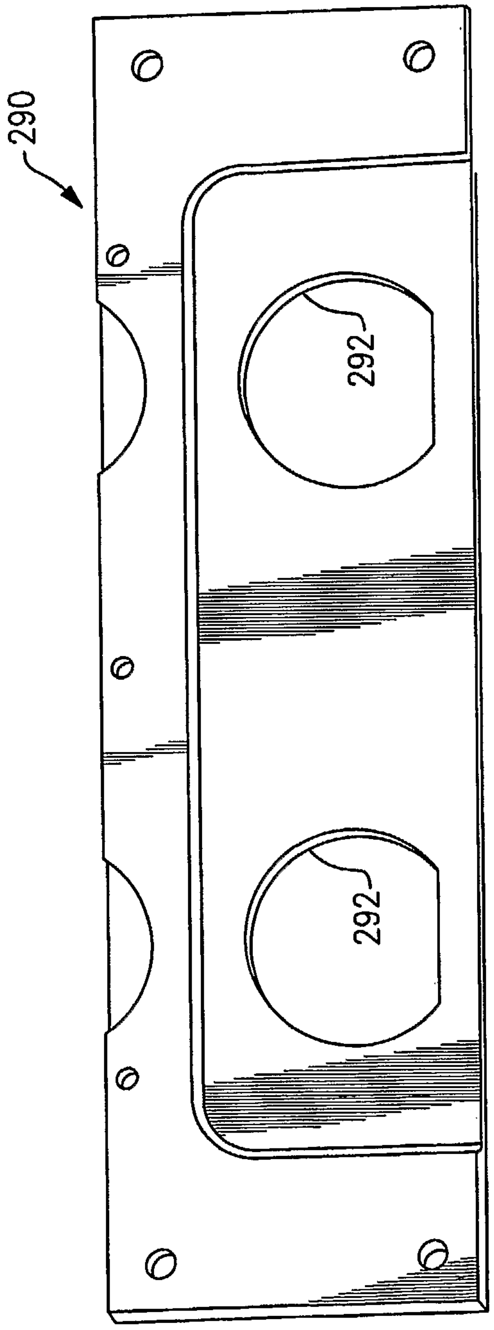
FIG. 14A is a top view of an embodiment of an adapter panel according to an embodiment of the invention.
Figure 14B:
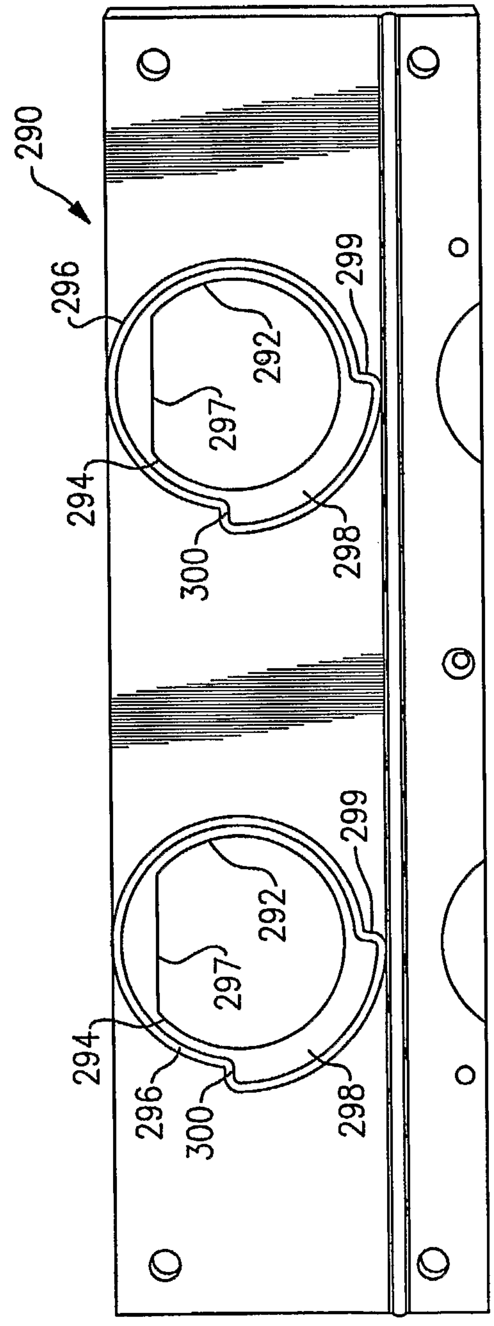
FIG. 14B is a bottom view of the adapter panel of FIG. 14A.

The use of the locking structures and the installation of the mixing nozzle are now described. Referring now to FIGS. 14A and 14B, a corresponding locking structure that facilitates the installation and locking of the mixing nozzle is found in an adapter panel 290. The adapter panel 290, in one embodiment (FIG. 9), is fixedly situated behind the front door and underneath the mixing chamber 184—its spatial relation to the water path is fixed and known. The adapter panel 290 defines one or more openings 292 sized and shaped to let through the asymmetric collar 278 but not the larger middle collar 280 of the nozzle body 189 (FIG. 13C). As depicted in the top view provided by FIG. 14A, in the particular embodiment where the asymmetric collar 278 is D-shaped, so is the adapter opening 292.

Referring to the bottom view of the adapter panel 290 provided by FIG. 14B, the D-shaped opening 292 is situated inside a largely circular recess such that the recess is a step-down from the rest of the panel 290 and the rim of the D-shaped opening 292 is surrounded by the recess floor 294. The recess border 296 is sized and shaped to fit the middle nozzle collar 280 snugly. The recess has an arc-shaped locking slot 298 in addition to the circle that fits the middle nozzle collar 280; the locking slot 298 is designed to dictate the locking and unlocking sequence in cooperation with the locking handle 284 (FIG. 13C). Specifically, the locking slot 298 is sized such that the top of the locking handle 284 fits snugly in the slot and can rotate back and forth between one side 299 of the slot and the other side 300, rotating the rest of the nozzle body with it.

Figure 15:
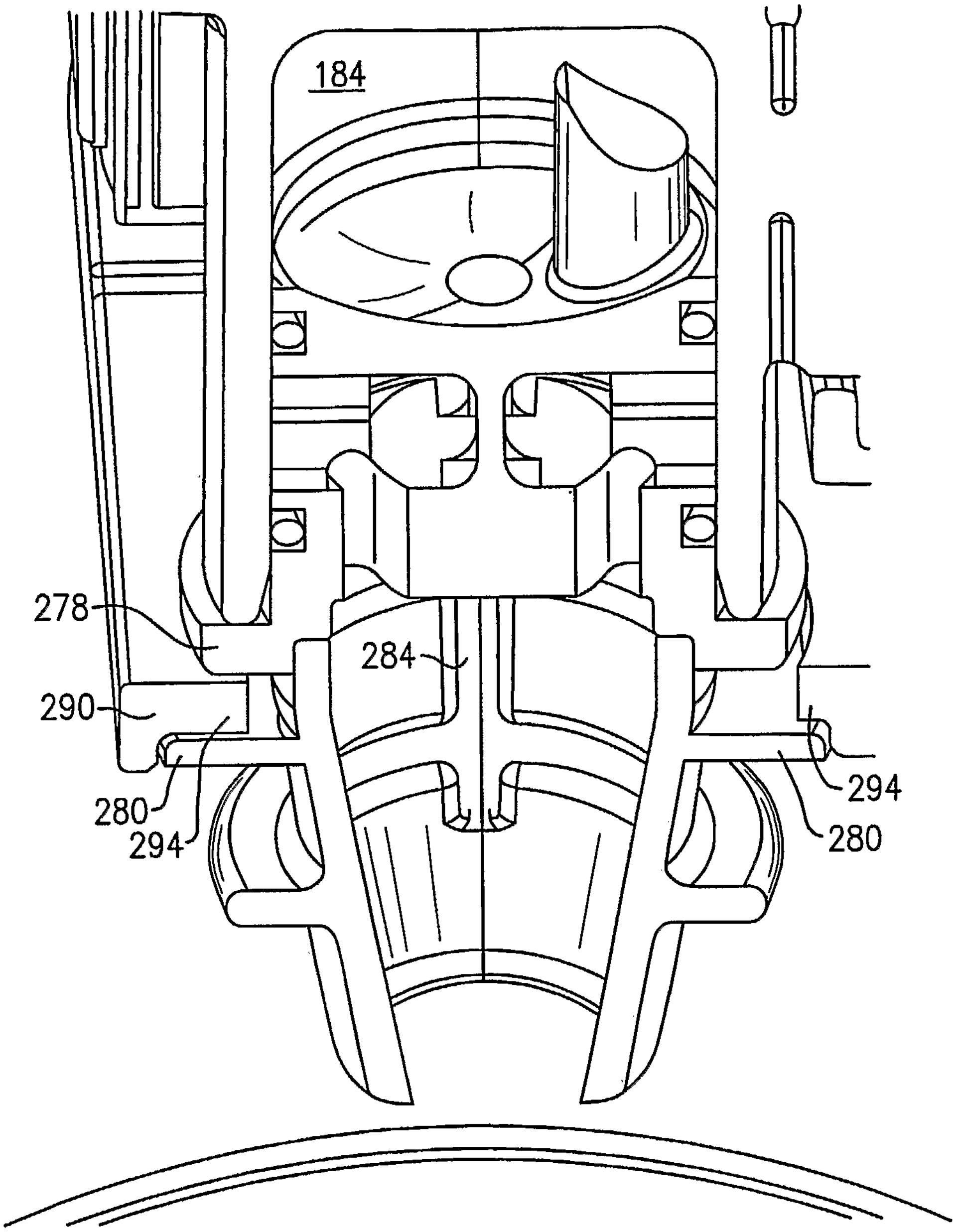
FIG. 15 is a cross-sectional view of the mixing nozzle of FIG. 13A engaged with the adapter panel of FIG. 14A in a beverage dispenser at an unlocked position, according to a principle of the invention.

In operation, referring to both FIGS. 13B and 14B, the nozzle inlet section 191 and the nozzle depressurizing section 193 are inserted from under the adapter panel 290 through the opening 292. Because of their asymmetric shapes, the flat side 279 of the D-shaped collar 278 must align with the flat side 297 of the opening 292. The middle nozzle collar 280 will not be able to go through the adapter opening 292, but will rest inside the panel's recess border 296 against the recess floor 294. At this point, the nozzle body 189 is at an unlocked position with the locking handle 284 rested against the "unlocked" side 299 of the locking slot 298. The unlocked position is depicted in FIG. 15 which shows the adapter panel 290's recess floor 294 engaged inside the locking groove 282 between the nozzle D-shaped collar 278 and the nozzle middle collar 280, and the locking handle 284 toward the very back of the mixing chamber 184.

Figure 16:
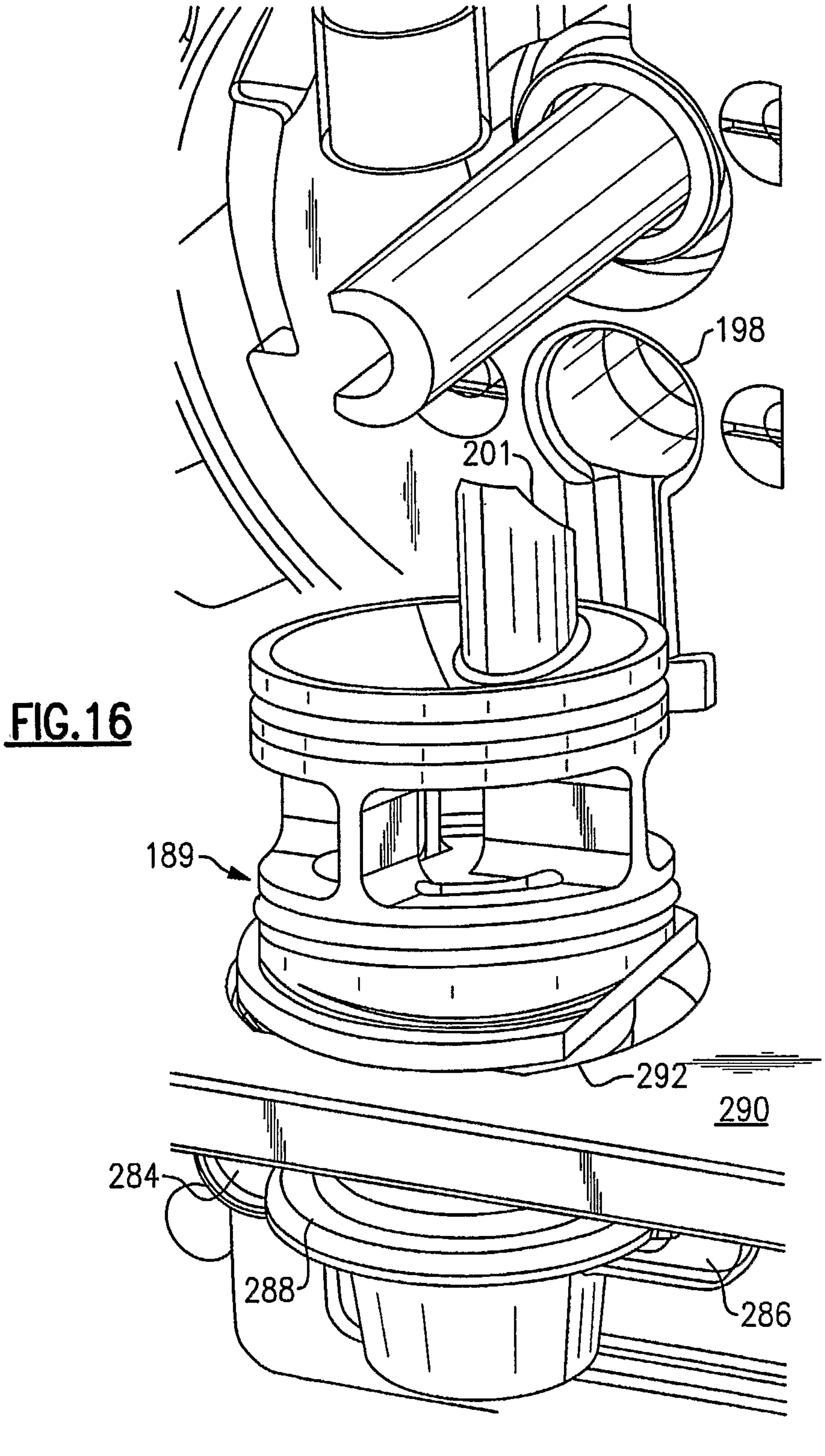
FIG. 16 is a perspective view of mixing nozzle of FIG. 13A engaged with the adapter panel of FIG. 14A in a beverage dispenser at a locked position, according to a principle of the invention.

Referring back to FIGS. 13B and 14B, the orientation of the locking slot 298 dictates that the locking handle 284 can only rotate counterclockwise (note that FIG. 14B is a view from the bottom) until it is stopped at the "locked" side 300 of the locking slot 298. The locked position is depicted in FIG. 16 in which the elevated blocking surface 201 faces directly at the water stream entering from the direction of the opening 198. To unlock the nozzle, simply reverse the above-described sequence of motion by turning the handles 284 and 286 clockwise until they stop at the unlocked position depicted in FIG. 15. The operator can then use the lower nozzle collar 288 as a gripping aide to pull the nozzle body 189 downward out of the opening 292 in the adapter panel 290.

Control System

To monitor and control the operation of various systems inside the dispenser, a control system is provided. The control system may include a microprocessor, one or more printed circuit boards and other components well known in the industry for performing various computation and memory functions. In one embodiment, the control system maintains and regulates the functions of the refrigeration system, the diluent delivery system, the concentrate delivery system, and the mixing and dispensing system. More specifically, the control system, with regard to:

- refrigeration system: monitors filter placement, activates water chilling loop, supports water chilling loop over cabinet chilling loop;
- diluent delivery system: regulates one or more gate-keeping switches that control the water flow at various points, regulates pressure of the water flow; receives and stores flow rate output;
- concentrate delivery system: monitors pump head lock, receives and stores information regarding the concentrate including desired mix ratio of the product, ascertains concentrate status, computes and regulates pump speed and fill volumes, controls piston position;
- mixing and dispensing system: activates cleaning of the system, dispenses the right fill volumes; and
- diagnostics: identifies errors and provides correctional instructions.

The above outline is meant to provide general guidance and should not be viewed as strict delineation as the control system often works with more than one system to perform a particular function. In performing refrigeration-related functions, the control system, as described earlier, ensures that the refrigeration system cannot be energized if the filter is not properly installed. In that case, the control system may further provide a diagnostic message to be displayed reminding an operator to install the filter. The control system further monitors, through output signal from the flowmeter, the amount of water that has passed through the flowmeter, and allows the activation of the primary water chilling loop only after sufficient amount of water, e.g., 21 ounces (about 0.62 L), has passed to prevent freeze-up of the water circuit.

Once the primary water chilling loop has been activated, however, the control system will support its function over secondary cabinet chilling loop. The control system also ensures that only one refrigeration loop is energized at any given time, and that the cabinet chilling loop is energized when the cabinet is above a predetermined temperature.

The diluent delivery system may include gate-keeping switches such as solenoid valves at various points along the water route. The control system controls the operation of these switches to regulate water flow, e.g., in and out of water chilling loop, specifically, as water enters and exits the BPHX. The control system also regulates the pressure of the water flow, through pressure regulators, for instance. Output signals from the flowmeter are sent to the control system for processing and storage.

In each dispensing cycle, once a portion size has been requested, the control system determines when the request has been fulfilled by reading the water flow from the flowmeter and adding the volume dispensed from the concentrate pump. Each of the portions will be capable of being calibrated through a volumetric teach routine. Provisions to offset the portion volume for the addition of ice may be incorporated into the control scheme.

With regard to the concentrate delivery system, the control system ensures that no dispensing cycle starts if the pump head is not properly assembled through the locking ring, as described earlier. The control system, following the master-follower plan where water is the master and the concentrate is the follower, regulates the pump speed based on computed fill volumes and detected water flow rate to achieve a desired mix ratio. Unlike some of the prior art control mechanisms where both the concentrate flow and the diluent flow are actively regulated, the control scheme of the present invention only actively adjusts one parameter (pump speed), making the system more reliable, easier to service, and less prone to break-down. At the end of each dispensing cycle, the control system ensures that the piston in the concentrate pump is returned to the intake position so that a seal is effectively formed between the concentrate delivery system and the mixing and dispensing system.

Figure 17:
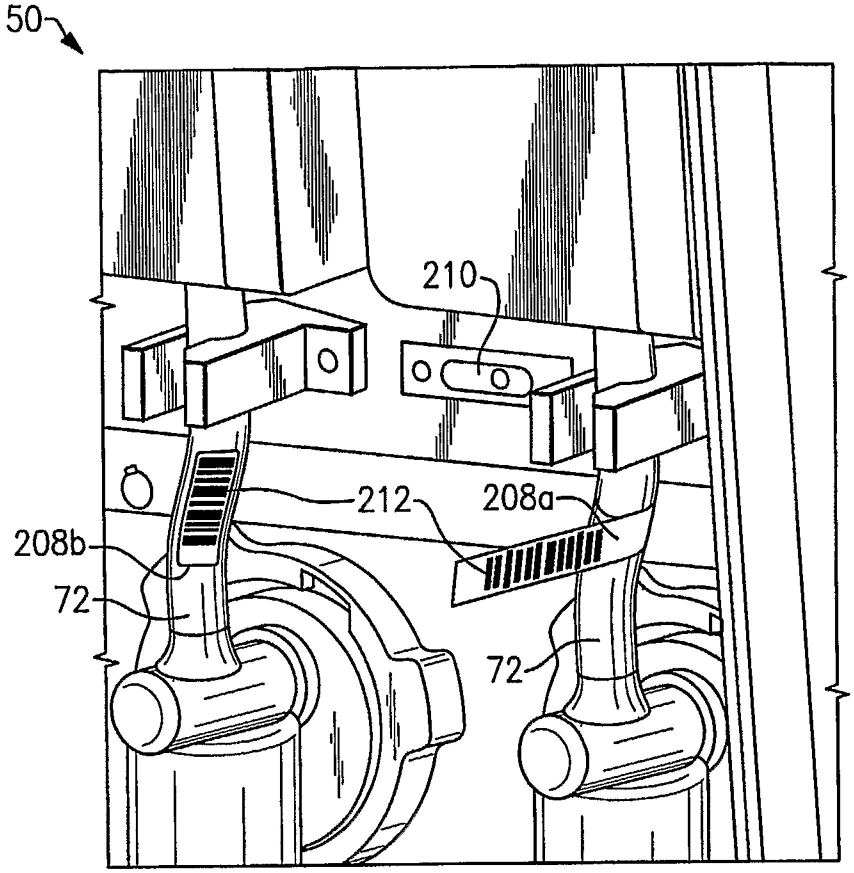
FIG. 17 is a perspective view of part of the front of the dispenser with the front door open to reveal a data input system.

Referring now to FIG. 17, to provide the control system with information regarding a package of concentrate as it is loaded into the dispensing system, the present invention provides a data input system. The system includes a label 208*a* or 208*b* and a label reader 210 installed in the dispenser 50. The label reader 210 may be an optical scanner, e.g., a laser scanner or a light-emitting diode (LED) scanner. In one embodiment, the label reader 210 is an Intermec® E1022 Scan Engine, commercially available from Intermec Technologies Corporation, housed behind a protective cover. In another embodiment, the data input system employs radio frequency identification (RFID) technology and the label reader 210 is a radio frequency sensor. The label 208*a* is detachably affixed to the concentrate drainage tube 72, which is preferably made of a pliable material, in the form of a tag, tape, sticker, chip, or a similar structure, while label 208*b* is permanently associated with, e.g., directly printed onto, the concentrate drainage tube 72. In one embodiment, the label 208*a* is made of waterproof mylar and backed with adhesive. The label 208*a* or 208*b* each includes certain information in a machine-readable form 212 regarding the particular concentrate package that the label is associated with. The machine-readable form 212 may be optically, magnetically or electronically or otherwise readable. In one embodiment, the machine-readable form 212 is readable by radio frequency. The information may include: data on desired compositional ratio between the concentrate and the diluent in the postmix product, whether the product requires a low (product with ice) or high (product without ice) fill volume of the concentrate for any given portion size, the expiration date to ensure food safety, flavor identity of the concentrate, and so on. In a preferred embodiment, the label includes some unique information about each package, such that a unique and package-specific identifier can be generated. For example, the label may indicate when the concentrate was packaged up to the second, which would typically be unique for each package.

Figure 18:
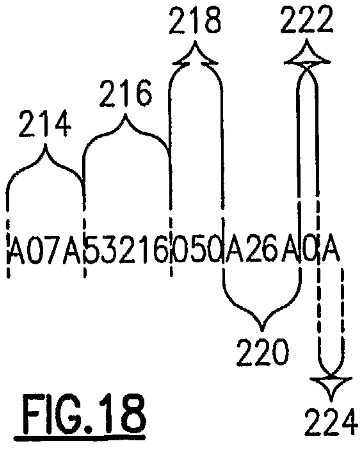
FIG. 18 is a formulaic representation of the content of a label associated with each concentrate package, according to an embodiment of the invention.

Referring now to FIG. 18, in an example of the label, the data is presented in a barcode that corresponds to the parameters represented graphically herein. Specifically, the first data set 214 represents the packaging date "Jan. 7, 2000." The second data set 216 represents the packaging time in the format of "hour-minute-second" (the illustrated example uses a random integer of five digits). The third data set 218 represents an indicium for a desired compositional ratio between a diluent and the concentrate in the postmix product, as in this particular example, 5:1. The fourth data set 220 represents the expiration date of the package "Jan. 26, 2000." The fifth data set 222 represents ice status, i.e., whether ice is typically added to the postmix product derived from this concentrate. The sixth data set 224 represents concentrate's flavor identity, in this case, "A" for orange juice. The control system is programmed to translate each data set into real information according to preset formulas.

Once the reader 210 obtains package-specific information from the label 208*a* or 208*b*, it sends the information to the control system. The control system is then able to display such information for the user, to regulate the mixing and dispensing of the product, to track the amount of remaining concentrate, and to monitor freshness of the concentrate to ensure safe consumption.

Figure 19:
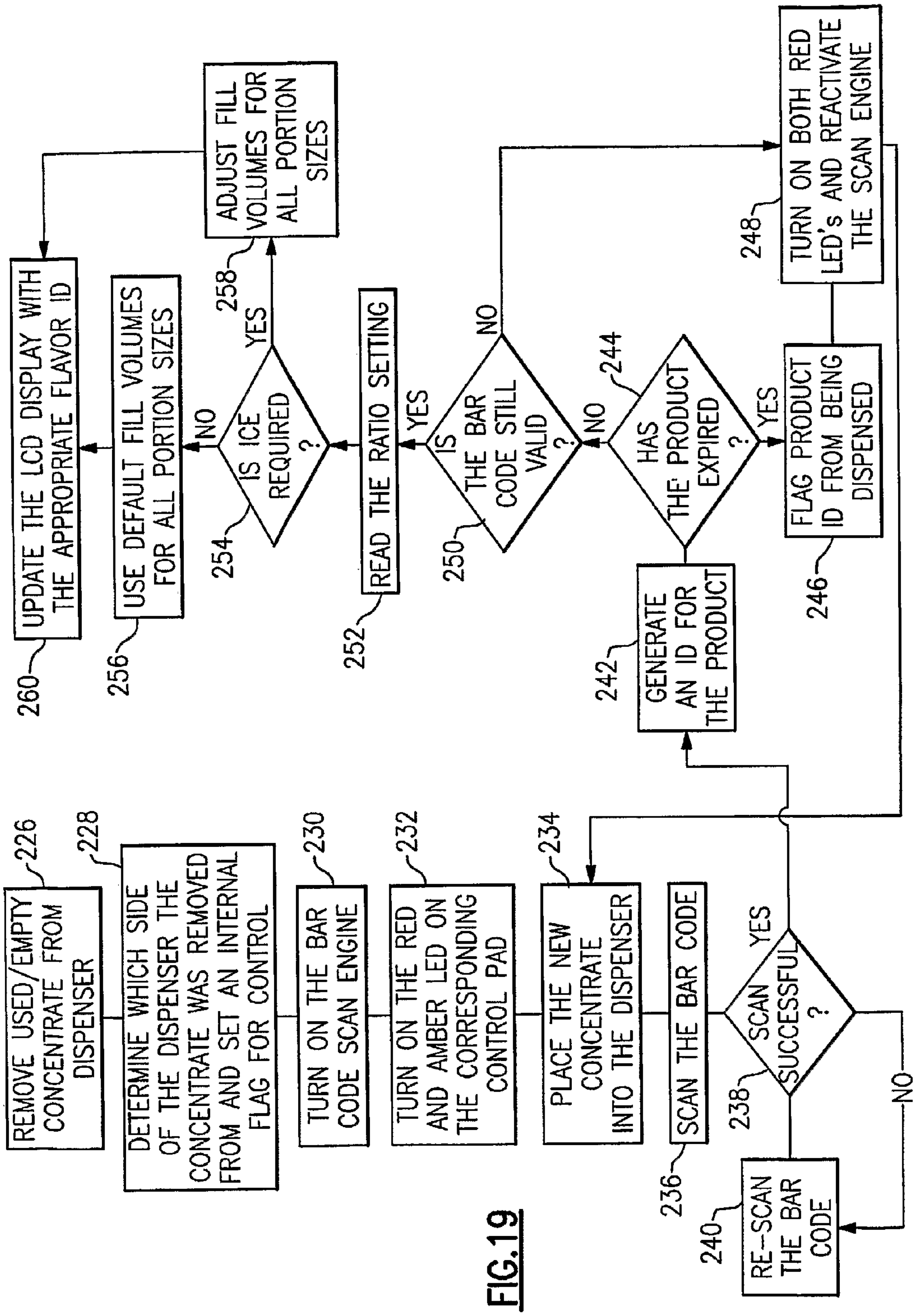
FIG. 19 is block diagram depicting operational steps involving an operator and the control system of the dispenser, according to an embodiment of the invention.

Referring now to FIG. 19, operational steps related to the data input system are illustrated. In step 226, a concentrate holder with an empty or expired concentrate package is removed from the concentrate cabinet. In step 228, it is then determined which side of the dispenser was the holder removed from or otherwise emptied. An internal flag is set for the control regarding the empty/out status. This can be accomplished through a variety of ways. For example, the machine may have a sensor that monitors the position of the concentrate holder, or the machine can be manually taught which side the concentrate holder was removed from. In one embodiment, a magnet is embedded in the concentrate holder (e.g., at the bottom) such that removal the holder triggers a reed switch at a corresponding position inside the dispenser to signal the removal to the control system.

Still referring to FIG. 19, once the control learns that a concentrate holder has been removed from the dispenser, in step 230, it actuates the label reader, e.g., an optical scanner, and in step 232, turns on indicators for the affected side, e.g., a red and amber LED. In step 234, an operator refills the holder with a new concentrate package and places the holder back into dispenser. In step 236, the operator manually presents a new label on the new drainage tube for the activated scanner and scans the barcode. Alternatively, the label is automatically detected and read by a sensor or reader in the dispenser. In step 238, the control determines if the scan is successful. If not, it will direct the operator to rescan the barcode in step 240. If the scan is successful, however, the scanner will power off and a unique product identifier is generated by the control in step 242. This unique identifier, specific for each concentrate package, is kept in a registry on the control as a permanent record to prevent product tempering.

Because the control system regulates the pump speed and the pump delivers a set amount of concentrate through each revolution, the control system can monitor the amount of concentrate dispensed from a particular package at any given time and assign the information to the unique identifier. Accordingly, the control system can compute and display the theoretical volume left in a given package or to alert the operator when the concentrate is running low. Once the package is emptied out, the control will flag the associated identifier with a null status and not allow the package to be reinstalled. The unique product identifier will also be used by the control system to track how many times the package associated with it has been installed, and to continually monitor concentrate usage throughout the life of the package. If a package is removed from the dispenser prior to being completely used, the control will recognize the same package when it is reinstalled in the dispenser and will begin counting down the volume from the last recorded level.

Referring again to FIG. 19, the unique identifier is used to monitor and regulate other aspects of concentrate usage. For example, in step 244, the control determines if the concentrate has expired or passed the best-used-by date. In step 246, if the answer is affirmative, the control will flag that product identifier and disallow any further dispensing from the current package. In the next step 248, a warning signal is indicated, e.g., through two red LEDs. The control also reactivates the scanner and the sequence reverts to step 234 to start replacing the package. If it is determined that the concentrate has not expired in step 244, however, the control continues to determine if the barcode is still valid in step 250. If the answer is negative, step 248 and subsequent steps are initiated. If the answer is affirmative, step 252 is initiated where information on desired compositional ratio setting and previously obtained from scanning the package label is processed. In step 254, the control further determines, also from scanned information on the label, whether ice is normally required in the postmix product.

Based on information gathered in steps 252 and 254, the control computes the volume of the concentrate needed for each portion size requested by the operator. In step 256, default fill volumes are used for all portion sizes when it is indicated that no ice is needed for the postmix product. Otherwise, as in step 258, fill volumes are offset by a predetermined value if need for ice is indicated. In either case, the control proceeds to step 260 to update the dispenser display with the appropriate flavor identity, also obtained from the scanning of the label in step 236.

According to one feature of the invention, the control system is programmed and configured to regulate the mixing and dispensing process to achieve consistency in compositional ratio, e.g., between about 10:1 to about 2:1 for the ratio between the diluent and the concentrate. The control system needs two pieces of information to accomplish this task: desired compositional ratio and the flow rate of the diluent. The former can be obtained, as described above, through the data input system where a label provides the information to the control. The latter is received as an output signal generated by a metering device, e.g., a flowmeter, that is in electrical communication with the control circuit. In addition to set the rate of concentrate delivery, the control system, further based on portion size information, i.e., the specific portion size requested and whether ice is needed in the postmix product—this last information preferably also comes from a package label—decides on the duration of a dispensing cycle.

In an embodiment where a positive displacement pump, e.g., a nutating pump, is used to pump the concentrate into contact with the diluent to form a mixture, the motor is configured to actuate the nutating pump, and the amount of concentrate transferred by each motor revolution is fixed. Accordingly, encoder can be configured to regulate a rotary speed of the motor, and hence, the rate of concentrate transfer. The control system, in electrical communication with the encoder, sends a command to the encoder once it has computed a desired rotary speed and/or duration for a given dispensing cycle. Accordingly, the right amount/volume of the concentrate is added to each dispensing cycle.

For example, the control receives, from the package label, the desired compositional ratio between the water and the concentrate as 10:1. Further, the flowmeter signals the control that water is flowing at a rate of about 4 ounces (about 0.12 L) per second. That means the concentrate needs to be pumped at a rate of about 0.4 ounce (about 0.012 L) per second. Since each revolution of the pump piston always delivers 1/32 ounce (about 0.0009 L) of the concentrate, the control sets the piston to run at 12.8 revolutions per second. If a portion size of 21 ounces (about 0.62 L) is requested for a dispensing cycle and no ice is needed in the product according to the package label, the control will determine that the dispensing cycle should last for about 4.8 seconds.

Further, the control system can adjust the pump's motor speed. The encoder sends a feedback signal in relation to a current rotary speed to the control; and the control, in turn, sends back an adjustment signal based on the desired compositional ratio, and the water flow rate detected by the flowmeter. This is needed when water flow rate fluctuates, e.g., when a water supply is shared by multiple pieces of equipment. This is also necessary when the desired compositional ratio in the postmix product needs to be adjusted as opposed to have a fixed value. A preferred embodiment of the control system automatically adjusts the pump speed to ensure the desired compositional ratio is always provided in the postmix product.

Each of the patent documents and publications disclosed hereinabove is incorporated by reference herein for all purposes.

While the invention has been described with certain embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A machine-readable label for a package of a concentrate to be used in a beverage dispenser, said label comprising:
- an indicium for a desired compositional ratio between said concentrate and a diluent in a postmix product; and
- a further indicium specific to said package to be processed by a control system of the beverage dispenser for responsively preventing the operation of said beverage dispenser;
- said further indicium indicating the time of packaging of said concentrate in said package;
- wherein said further indicium indicates a desired volume of said concentrate for said postmix product;
- wherein said further indicium indicates whether ice should be added to said postmix product.

2. The machine-readable label of claim 1, wherein said further indicium indicates an expiration date of said package of said concentrate.

3. The machine-readable label of claim 1, wherein said further indicium indicates an identity of said concentrate.

4. The machine-readable label of claim 1, wherein said further indicium further indicates an expiration date, a packaging time, and an identity of said concentrate.

5. A machine-readable label for a package of a concentrate to be used in a beverage dispenser, said label comprising:

an indicium for a desired compositional ratio between said concentrate and a diluent in a postmix product; and a further indicium specific to said package to be processed by a control system of the beverage dispenser for responsively preventing the operation of said beverage dispenser;

wherein said further indicium indicates whether ice should be added to said postmix product.

6. The machine-readable label of claim 1 readable by an optical scanner.

7. The machine-readable label of claim 1 wherein said label is readable through radio frequency.

8. The machine-readable label of claim 1 comprising a barcode.

9. The machine-readable label of claim 1 wherein said label is fabricated in a waterproof form.

10. The machine-readable label of claim 1 wherein said label is permanently associated with said package.

11. A beverage dispenser comprising a control system that is configured to receive information from a machine-readable label for a package of a concentrate to be used in the beverage dispenser, said label comprising an indicium for a desired compositional ratio between said concentrate and a diluent in a postmix product and a further indicium which is representative of the amount of concentrate in said package; said control system having a controller for receiving a signal representative of said indicium and responsively 1) establishing an identify specific to said package, 2) monitoring the amount of concentrate disposed therefrom, and 3) computing and displaying the amount of concentrate remaining therein;

wherein said further indicium indicates whether ice should be added to said postmix product, and said control system calculates a desired volume of said concentrate based on said further indicium.

12. The beverage dispenser of claim 11, wherein said further indicium indicates a packaging time of said package.

13. The beverage dispenser of claim 11 further comprising a positive displacement pump that pumps a desired amount of said concentrate according to said desired compositional ratio.

14. The beverage dispenser of claim 11 wherein said control system calculates said desire amount of said concentrate based on a flow rate of said diluent.

15. The beverage dispenser of claim 11, further comprising a device that reads said label.

16. The beverage dispenser of claim 15 wherein said device comprises a radio frequency sensor.

17. A data input system as set forth in claim 1 wherein said controller applies said further indicium to determine that the useful life of the concentrate has expired.

18. A data input system as set forth in claim 1 wherein said controller applies aid further indicium to determine whether the concentrate packaging occurred within a particular time/date range.

* * * * *